(12) United States Patent
Shen et al.

(10) Patent No.: US 8,991,523 B2
(45) Date of Patent: Mar. 31, 2015

(54) ROLLING CUTTER ASSEMBLED DIRECTLY TO THE BIT POCKETS

(75) Inventors: Yuelin Shen, Spring, TX (US); Youhe Zhang, Spring, TX (US); Yuri Burhan, Spring, TX (US); Michael A. Siracki, The Woodlands, TX (US); Mahavir Nagaraj, Spring, TX (US); Bala Durairajan, Houston, TX (US); Scott D. McDonough, The Woodlands, TX (US); Peter Thomas Cariveau, Houston, TX (US)

(73) Assignee: Smith International, Inc., Houston, TX (US)

( * ) Notice: Subject to any disclaimer, the term of this patent is extended or adjusted under 35 U.S.C. 154(b) by 531 days.

(21) Appl. No.: 13/152,626

(22) Filed: Jun. 3, 2011

(65) Prior Publication Data
US 2011/0297454 A1 Dec. 8, 2011

Related U.S. Application Data

(60) Provisional application No. 61/351,035, filed on Jun. 3, 2010.

(51) Int. Cl.
*E21B 10/08* (2006.01)
*E21B 10/633* (2006.01)
*B23P 15/28* (2006.01)

(52) U.S. Cl.
CPC .............. *E21B 10/633* (2013.01); *B23P 15/28* (2013.01)
USPC ........... 175/331; 175/368; 175/336; 175/341; 175/413

(58) Field of Classification Search
None
See application file for complete search history.

(56) References Cited

U.S. PATENT DOCUMENTS

| | | | |
|---|---|---|---|
| 3,271,080 A * | 9/1966 | Gowanlock | 299/103 |
| 3,726,352 A * | 4/1973 | Olov Roos | 175/413 |
| 4,104,344 A | 8/1978 | Pope et al. | |
| 4,200,159 A * | 4/1980 | Peschel et al. | 175/428 |
| 4,288,248 A | 9/1981 | Bovenkerk et al. | |
| 4,553,615 A | 11/1985 | Grainger | |
| 4,721,422 A * | 1/1988 | Konwal | 408/233 |
| 4,738,322 A | 4/1988 | Hall et al. | |
| 4,756,631 A | 7/1988 | Jones | |
| 5,127,923 A | 7/1992 | Bunting et al. | |
| 5,494,477 A | 2/1996 | Flood et al. | |
| 5,662,720 A | 9/1997 | O'Tighearnaigh | |

(Continued)

OTHER PUBLICATIONS

International Search Report and Written Opinion issued in related International Patent Application No. PCT/US2011/039079; Dated Nov. 18, 2011 (7 pages).

(Continued)

*Primary Examiner* — Jennifer H Gay
*Assistant Examiner* — Caroline Butcher
(74) *Attorney, Agent, or Firm* — Osha Liang LLP

(57) ABSTRACT

A drill bit includes a bit body, a plurality of blades extending radially from the bit body, a plurality of cutter pockets disposed on the plurality of blades, at least one rolling cutter disposed in one of the cutter pockets, wherein each rolling cutter has a substrate, a cutting face, a cutting edge, and a side surface, and at least one blocker positioned adjacent to each of the at least one rolling cutters on a leading face of the blade, wherein each blocker has a retention end and an attachment end. The retention end of each blocker is positioned adjacent to a portion of the cutting face of each rolling cutter to retain the rolling cutter in the cutter pocket and the attachment end is attached to a portion of the blade.

43 Claims, 34 Drawing Sheets

(56) References Cited

U.S. PATENT DOCUMENTS

| | | | |
|---|---|---|---|
| 7,703,559 B2* | 4/2010 | Shen et al. | 175/432 |
| 7,909,121 B2* | 3/2011 | Voronin et al. | 175/435 |
| 2007/0079991 A1 | 4/2007 | Cooley et al. | |
| 2007/0278017 A1 | 12/2007 | Shen et al. | |
| 2009/0020339 A1 | 1/2009 | Sherwood, Jr. | |

OTHER PUBLICATIONS

International Preliminary Report of Patentability issued in corresponding International Application No. PCT/US2011/039079 dated Dec. 13, 2012 (2 pages).

* cited by examiner

ROLLING CUTTER ASSEMBLED DIRECTLY TO THE BIT POCKETS

CROSS-REFERENCE TO RELATED APPLICATIONS

Pursuant to 35 U.S.C. §119, this Application claims the benefit of U.S. Provisional Application 61/351,035 filed on Jun. 3, 2010, which is herein incorporated by reference in its entirety.

BACKGROUND OF INVENTION

Various types and shapes of earth boring bits are used in various applications in the earth drilling industry. Earth boring bits have bit bodies which include various features such as a core, blades, and cutter pockets that extend into the bit body or roller cones mounted on a bit body, for example. Depending on the application/formation to be drilled, the appropriate type of drill bit may be selected based on the cutting action type for the bit and its appropriateness for use in the particular formation.

Drag bits, often referred to as "fixed cutter drill bits," include bits that have cutting elements attached to the bit body, which may be a steel bit body or a matrix bit body formed from a matrix material such as tungsten carbide surrounded by a binder material. Drag bits may generally be defined as bits that have no moving parts. However, there are different types and methods of forming drag bits that are known in the art. For example, drag bits having abrasive material, such as diamond, impregnated into the surface of the material which forms the bit body are commonly referred to as "impreg" bits. Drag bits having cutting elements made of an ultra hard cutting surface layer or "table" (typically made of polycrystalline diamond material or polycrystalline boron nitride material) deposited onto or otherwise bonded to a substrate are known in the art as polycrystalline diamond compact ("PDC") bits.

PDC bits drill soft formations easily, but they are frequently used to drill moderately hard or abrasive formations. They cut rock formations with a shearing action using small cutters that do not penetrate deeply into the formation. Because the penetration depth is shallow, high rates of penetration are achieved through relatively high bit rotational velocities.

In PDC bits, polycrystalline diamond compact (PDC) cutters are received within cutter pockets, which are formed within blades extending from a bit body, and are typically bonded to the blades by brazing to the inner surfaces of the cutter pockets. The PDC cutters are positioned along the leading edges of the bit body blades so that as the bit body is rotated, the PDC cutters engage and drill the earth formation. In use, high forces may be exerted on the PDC cutters, particularly in the forward-to-rear direction. Additionally, the bit and the PDC cutters may be subjected to substantial abrasive forces. In some instances, impact, vibration, and erosive forces have caused drill bit failure due to loss of one or more cutters, or due to breakage of the blades.

In a typical PDC cutter, a compact of polycrystalline diamond ("PCD") (or other superhard material, such as polycrystalline cubic boron nitride) is bonded to a substrate material, which is typically a sintered metal-carbide to form a cutting structure. PCD comprises a polycrystalline mass of diamond grains or crystals that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

PCD may be formed by subjecting a volume of diamond grains to certain high-pressure/high-temperature ("HPHT") conditions in the presence of a sintering aid or binder. Conventionally, the sintering aid or binder is provided in the form of a solvent metal catalyst material, such as one or more elements from Group VIII of the Periodic table. The solvent metal catalyst may be added and mixed with the diamond grains prior to HPHT processing and/or may be provided during the HPHT process by infiltration from a substrate comprising the solvent metal catalyst as one of its constituent materials.

A conventional PDC cutter may be formed by placing a cemented carbide substrate into a HPHT container. A mixture of diamond grains or diamond grains and catalyst binder is placed atop the substrate in the container and the container is loaded into a HPHT device that is configured and operated to subject the container and its contents to a desired HPHT condition. In doing so, metal binder migrates from the substrate and passes through the diamond grains to promote intergrowth between the diamond grains. As a result, the diamond grains become bonded to each other to form the diamond layer, and the diamond layer is in turn bonded to the substrate. The substrate often comprises a metal-carbide composite material, such as tungsten carbide. The deposited diamond body is often referred to as a "diamond layer", a "diamond table", or an "abrasive layer."

An example of a prior art PDC bit having a plurality of cutters with ultra hard working surfaces is shown in FIGS. 1A and 1B. The drill bit 100 includes a bit body 110 having a threaded upper pin end 111 and a cutting end 115. The cutting end 115 typically includes a plurality of ribs or blades 120 arranged about the rotational axis L (also referred to as the longitudinal or central axis) of the drill bit and extending radially outward from the bit body 110. Cutting elements, or cutters, 150 are embedded in the blades 120 at predetermined angular orientations and radial locations relative to a working surface and with a desired back rake angle and side rake angle against a formation to be drilled.

A plurality of orifices 116 are positioned on the bit body 110 in the areas between the blades 120, which may be referred to as "gaps" or "fluid courses." The orifices 116 are commonly adapted to accept nozzles. The orifices 116 allow drilling fluid to be discharged through the bit in selected directions and at selected rates of flow between the blades 120 for lubricating and cooling the drill bit 100, the blades 120 and the cutters 150. The drilling fluid also cleans and removes the cuttings as the drill bit 100 rotates and penetrates the geological formation. Without proper flow characteristics, insufficient cooling of the cutters 150 may result in cutter failure during drilling operations. The fluid courses are positioned to provide additional flow channels for drilling fluid and to provide a passage for formation cuttings to travel past the drill bit 100 toward the surface of a wellbore (not shown).

Referring to FIG. 1B, a top view of a prior art PDC bit is shown. The cutting face 118 of the bit shown includes six blades 120-125. Each blade includes a plurality of cutting elements or cutters generally disposed radially from the center of cutting face 118 to generally form rows. Certain cutters, although at differing axial positions, may occupy radial positions that are in similar radial position to other cutters on other blades.

Referring to FIG. 2, a profile of prior art PDC bit 200 is shown as it would appear with all blades 220 and all cutting elements 250 (including primary cutters and backup cutting elements) rotated into a single rotated profile. As shown, the rotated profile of the plurality of blades 220 includes blade profiles 225. Blade profiles 225 and the bit face 218 may be divided into three different regions labeled cone region 222, shoulder region 224, and gage region 226. Cone region 222 is concave in this embodiment and comprises the inner most region of bit 200 (e.g., cone region 222 is the central most region of bit 200). Adjacent cone region 222 is shoulder (or the upturned curve) region 224. It should be noted that in some prior art PDC bits, the shoulder region 224, as it is depicted in FIG. 2, may be defined as including both a nose region and a shoulder region, wherein the nose region is the region that first contacts the bottom of the wellbore. Next to shoulder region 224 is the gage region 226 which is the portion of the bit face 218 which defines the outer radius 205 of bit 200. Outer radius 205 extends to and therefore defines the full gage diameter of bit 200.

Still referring to FIG. 2, cone region 222 is defined by a radial distance along the x-axis measured from central axis L. It is understood that the x-axis is perpendicular to central axis L and extends radially outward from central axis L. Cone region 222 may be defined by a percentage of the outer radius 205 of the bit 200. The actual radius of cone region 222, measured from central axis L, may vary from bit to bit depending on a variety of factors including without limitation, bit geometry, bit type, location of backup cutter elements, or combinations thereof.

Conventional PCD includes 85-95% by volume diamond and a balance of the binder material, which is present in PCD within the interstices existing between the bonded diamond grains. Binder materials that are typically used in forming PCD include Group VIII elements, with cobalt (Co) being the most common binder material used.

Conventional PCD is stable at temperatures of up to 700-750° C., after which observed increases in temperature may result in permanent damage to and structural failure of PCD. In particular, heat caused by friction between the PCD and the work material causes thermal damage to the PCD in the form of cracks, which lead to spalling of the diamond layer and delamination between the diamond layer and substrate. This deterioration in PCD is due to the significant difference in the coefficient of thermal expansion of the binder material, which is typically cobalt, as compared to diamond. Upon heating of PCD, the cobalt and the diamond lattice will expand at different rates, which may cause cracks to form in the diamond lattice structure and result in deterioration of the PCD. High operating temperatures may also lead to back conversion of the diamond to graphite causing loss of microstructural integrity, strength loss, and rapid abrasive wear.

In order to overcome this problem, strong acids may be used to "leach" the cobalt from the diamond lattice structure (either a thin volume or the entire body) to at least reduce the damage experienced from different expansion rates within a diamond-cobalt composite during heating and cooling. Examples of "leaching" processes can be found, for example, in U.S. Pat. Nos. 4,288,248 and 4,104,344. Briefly, a strong acid, typically nitric acid or combinations of several strong acids (such as nitric and hydrofluoric acid) may be used to treat the diamond table, removing at least a portion of the co-catalyst from the PDC composite. By leaching out the cobalt, thermally stable polycrystalline ("TSP") diamond may be formed. In certain embodiments, only a select portion of a diamond composite is leached, in order to gain thermal stability with less effect on impact resistance. As used herein, the term thermally stable polycrystalline (TSP) includes both of the above (i.e., partially and completely leached) compounds. Interstitial volumes remaining after leaching may be reduced by either furthering consolidation or by reinfiltrating the volume with a secondary material. An example of reinfiltration can be found in U.S. Pat. No. 5,127,923.

However, some of the problems described above that plague PCD cutting elements, i.e., chipping, spalling, partial fracturing, cracking or exfoliation of the cutting table, are also often encountered in TSP cutters or other types of cutters having an ultra hard diamond-like cutting table such as polycrystalline cubic boron nitride (PCBN) bonded on a cemented carbide substrate. In particular, it has been observed that TSP cutters are slightly more prone to spalling and delamination under severe loads. These problems result in the early failure of the cutting table and thus, in a shorter operating life for the cutter.

Furthermore, in drag bits having fixed PDC cutters, a common cutting surface contacts the formation during drilling. Over time, the edge of the cutting surface that constantly contacts the formation begins to wear down, forming a local wear flat, or an area worn disproportionately to the remainder of the cutting element. Local wear flats may result in longer drilling times due to a lose of rate of penetration caused by dulling of edge of the cutting element. Additionally, fixed cutters are under constant thermal and mechanical load. As a result, heat builds up along the cutting surface, and results in cutting insert fracture. When a cutting element breaks, the drilling operation may sustain a loss of rate of penetration, and additional damage to other cutting elements, should the broken cutting element contact a second cutting element.

Accordingly, there exists a continuing need for developments in improving the life of cutting elements.

SUMMARY OF INVENTION

In one aspect, embodiments of the present disclosure relate to a drill bit having a bit body; a plurality of blades extending radially from the bit body; a plurality of cutter pockets disposed on the plurality of blades; at least one rolling cutter disposed in one of the cutter pockets, wherein each rolling cutter has a substrate, a cutting face, a cutting edge, and a side surface; and at least one blocker positioned adjacent to each of the at least one rolling cutters on the leading face of the blade, wherein each blocker has a retention end and an attachment end. The retention end of each blocker is positioned adjacent to a portion of the cutting face of each rolling cutter to retain the rolling cutter in the cutter pocket and the attachment end is attached to a portion of the blade.

In another aspect, embodiments of the present disclosure relate to a drill bit having a bit body; a plurality of blades extending radially from the bit body, wherein each blade has a leading face and a trailing face; a plurality of cutter pockets disposed on the plurality of blades; at least one rolling cutter, wherein each rolling cutter is disposed in one of the cutter pockets, and wherein each rolling cutter comprises a substrate and a cutting face; and at least one blocker, wherein each blocker covers a portion of the cutting face of one or more rolling cutters.

In yet another aspect, embodiments of the present disclosure relate to a method of manufacturing a drill bit that includes forming a bit body, placing a rolling cutter into at least one of a plurality of cutter pockets formed on the bit body, wherein the rolling cutter has a substrate, a cutting face, and a cutting edge, and attaching an attachment end of a blocker to a portion of a blade on the bit body, such that a retention end of the blocker covers a portion of the cutting face.

Other aspects and advantages of the invention will be apparent from the following description and the appended claims.

DETAILED DESCRIPTION

Drill bits according to embodiments of the present disclosure and methods for forming such drill bits are described below. According to some embodiments of the present disclosure, a drill bit has at least one rolling cutter and a blocker positioned adjacent to each rolling cutter. Rolling cutters of the present disclosure may be used on downhole cutting tools including, for example, drag bits and hybrid drill bits.

A rolling cutter, as referred to herein, is a cutting element having at least one surface that may rotate within a cutter pocket as the cutting element contacts the drilling formation. As the cutting element contacts the formation, shearing may allow a portion of the cutting element to rotate around a cutting element axis extending through a central plane of the cutting element. Rolling cutters according to the present disclosure are retained within the cutter pocket by a blocker. As used herein, a blocker is a component separate from the bit that is attached to the bit, adjacent to the cutting face of a rolling cutter to prevent the rolling cutter from coming out of the cutter pocket. In a particular embodiment, the blockers of the present disclosure may be attached or coupled with the bit body in a position radially exterior to the rolling cutter. Thus, to retain the rolling cutter, the blocker partially covers a portion of the upper surface or cutting face of the rolling cutter. A rolling cutter and a corresponding blocker together may be referred to as a rolling cutter assembly.

Rotation of a portion of the cutting element may allow a cutting surface to cut formation using the entire outer edge (i.e., the entire circumferential edge) of the cutting surface, rather than the same section of the outer edge, as provided by the prior art. The entire edge of the cutting element may contact the formation, generating more uniform cutting element edge wear, thereby preventing for formation of a local wear flat area. Because the edge wear is more uniform, the cutting element may not wear as quickly, thereby having a longer downhole life, and thus increasing the overall efficiency of the drilling operation.

Rotatable cutting elements may also prevent or at least reduce high temperatures typically generated by fixed cutters during drilling. Because the cutting surface of prior art cutting elements is constantly contacting formation, heat may build-up that may cause failure of the cutting element due to fracture. Embodiments in accordance with the present disclosure may avoid this heat build-up because the edge contacting the formation changes. By decreasing the thermal and mechanical load experienced by the cutting surface of the cutting element, cutting element life may be increased, thereby allowing more efficient drilling.

Figure 3A:
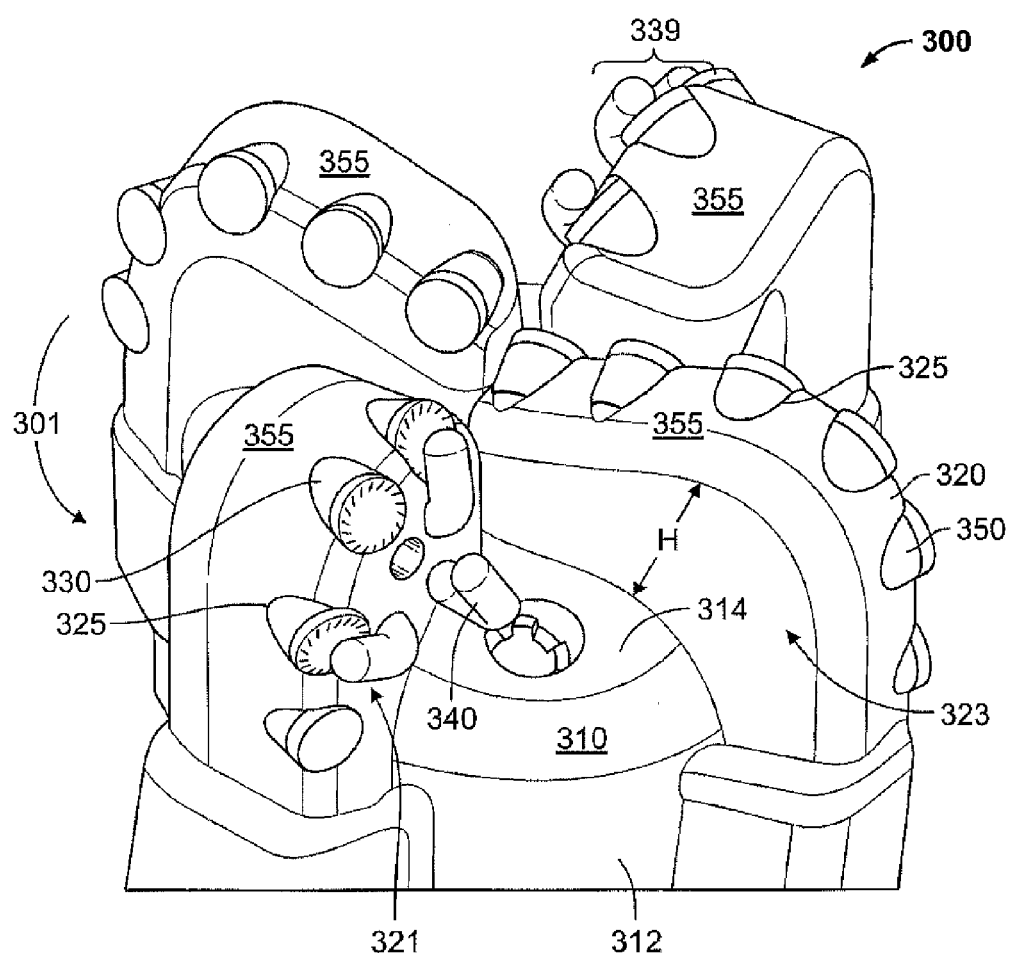
FIGS. 3A-B show a side and top view of a drill bit according to embodiments of the present disclosure.
Figure 3B:
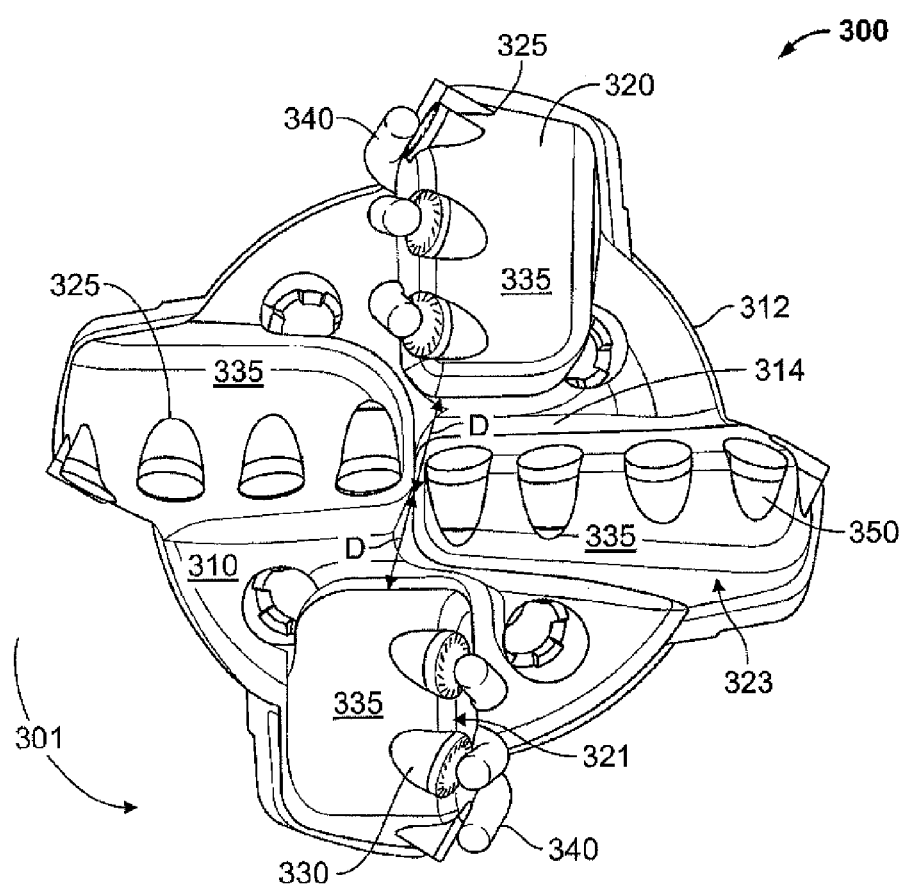

By way of illustration, FIGS. 3A and 3B show an exemplary drill bit having rolling cutter assemblies according the present disclosure. Drill bit 300 may have a bit body 310, a plurality of blades 320 extending radially from the bit body 310, a plurality of cutter pockets 325 disposed on the plurality of blades 320, and at least one rolling cutter assembly 339. Each blade 320 of the bit may have a leading face 321 and a trailing face 323, wherein the leading face 321 refers to the side of the blade that faces in the direction of bit rotation 301. The cutter pockets 325 may be positioned on the top of each blade, near or at the leading side 321 of the blade 320, and at least one rolling cutter 330 may be disposed in at least one of the cutter pockets 325. A blocker 340 may be placed adjacent to each rolling cutter 330, and covering a portion of the cutting face to retain rolling cutter 330 in cutter pocket 325. A blocker 340 may be attached to the bit body by insertion of the opposite end of the blocker 340 into a hole or cavity in the leading side 321 of the blade 320 that is spaced a selected distance apart and below from the cutter pocket 325. Rolling cutters 330 rotate about their longitudinal axis and are not fixed within cutter pockets 325 by chemical or mechanical means that prevent rotation. In some embodiments, at least one fixed cutting element 350 may also be disposed in at least one of the cutter pockets 325.

Rolling Cutters

Figure 4A:
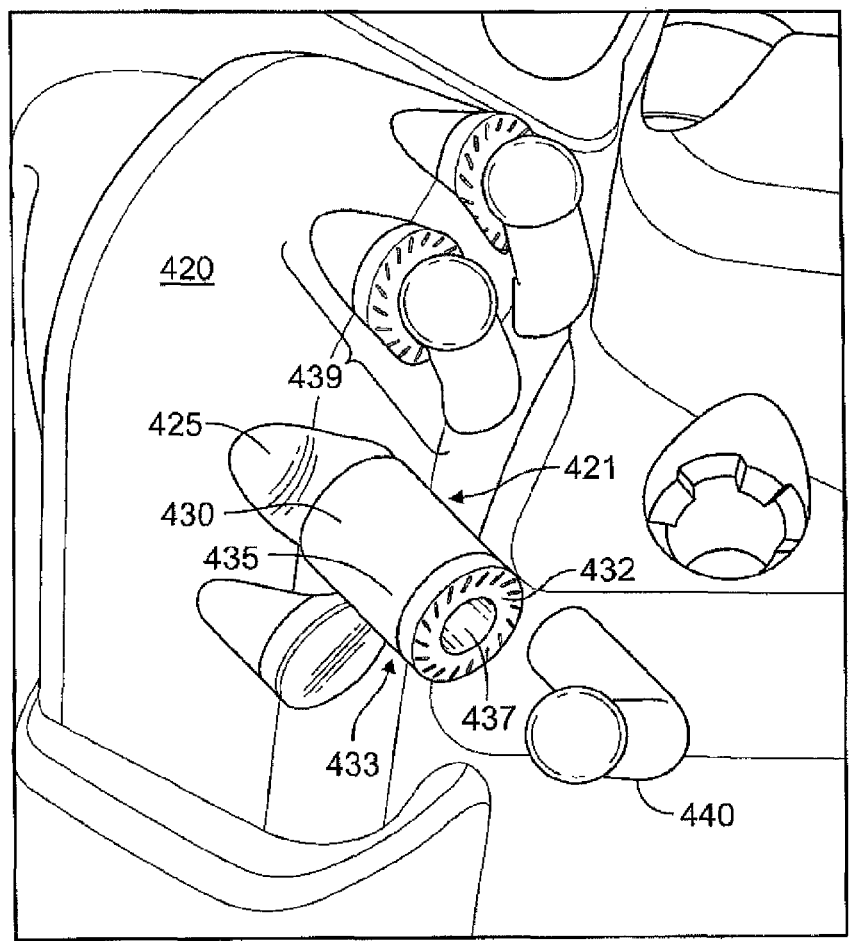
FIGS. 4A-C show an expanded view and cross-sectional views of embodiments according to the present disclosure.
Figure 4B:
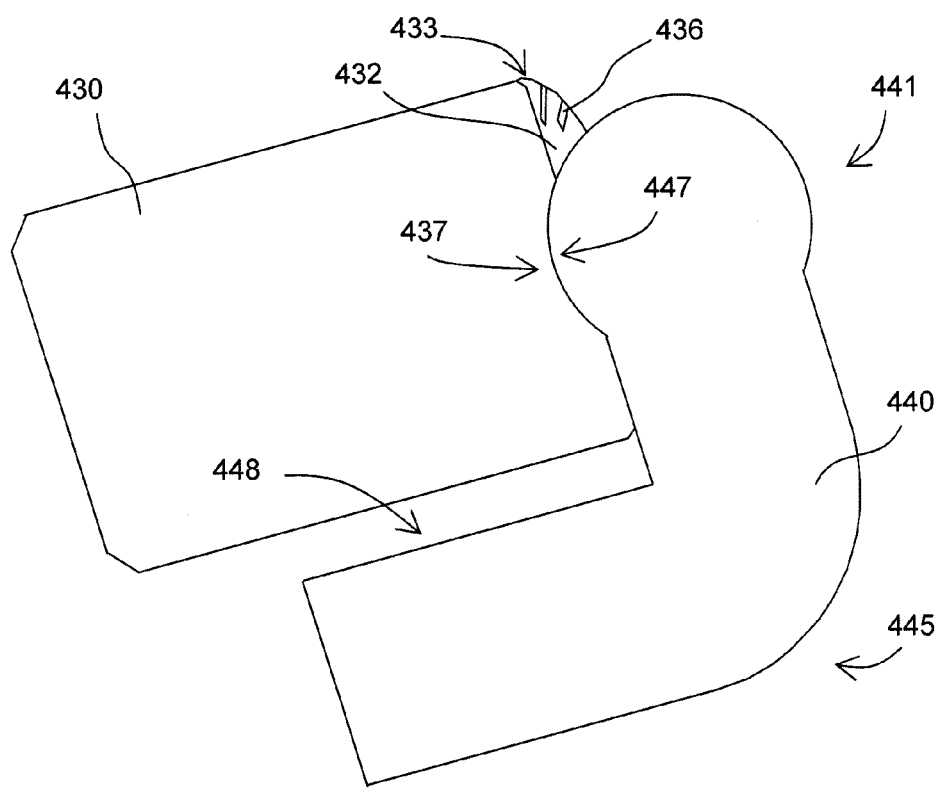
Figure 4C:
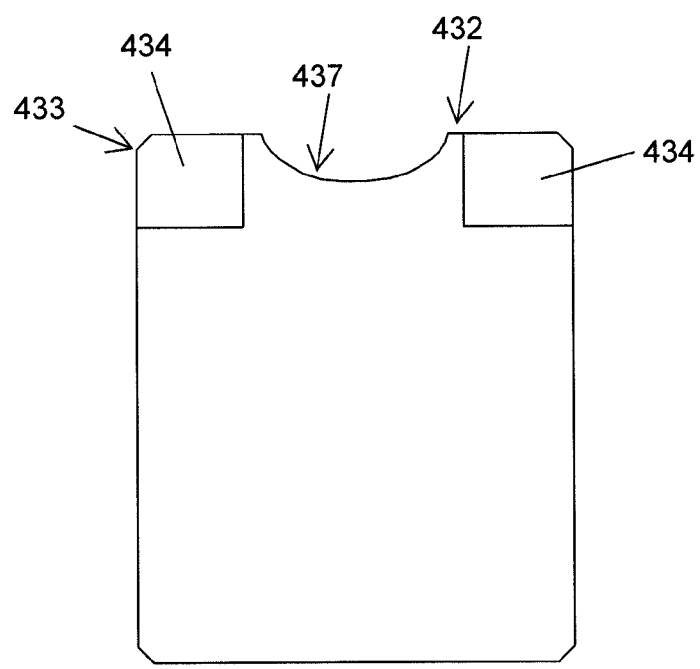
Figure 10:
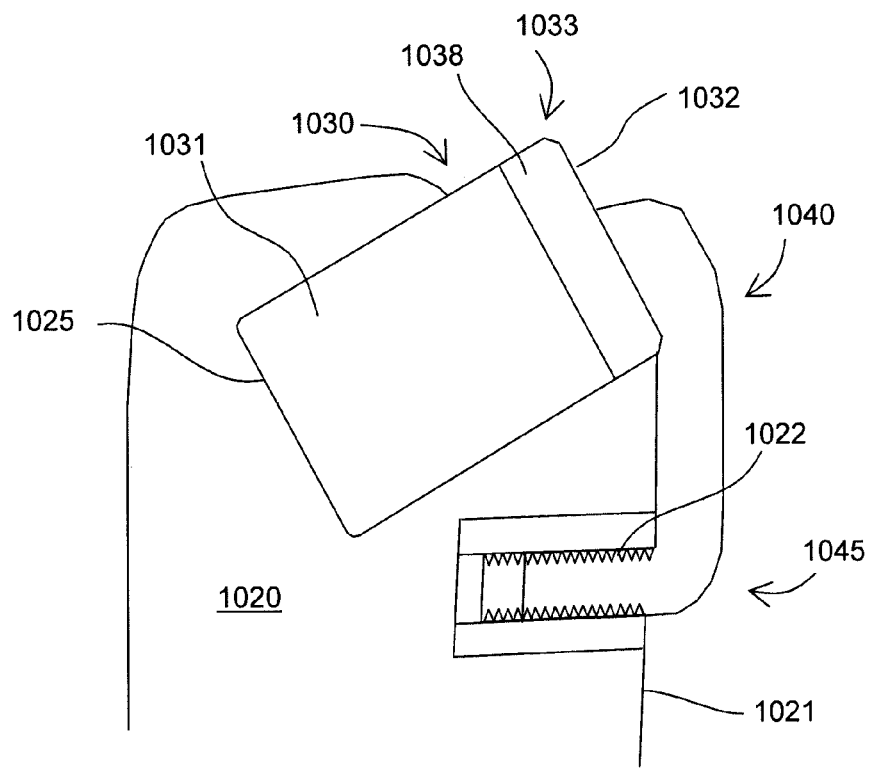
FIG. 10 shows a cross-sectional view of another exemplary embodiment of the present disclosure.

Referring now to FIGS. 4A-C, a closer view of a rolling cutter assembly according to the present disclosure is shown. Rolling cutter assembly 439 includes a rolling cutter 430 and a blocker 440. The rolling cutter 430 may have a cylindrical body as a substrate 431, which may be formed from cemented carbide such as tungsten carbide. Although FIGS. 4A-B show a cylindrical rolling cutter substrate, other embodiments of the present disclosure may have a non-cylindrical substrates. A cutting face 432 may be formed on one end of the rolling cutter 430, wherein the cutting face 432 is the end of the rolling cutter 430 that faces a corresponding blocker 440 and that contacts formation in a wellbore. The cutting face 432 may be made from any number of hard and/or wear resistant materials, including, for example, tungsten carbide, polycrystalline diamond, and thermally stable polycrystalline diamond. Further, the cutting face 432 may be made from a material that is different from the substrate or the same as the substrate 431. For example, a rolling cutter having a cutting face made from a material different from the substrate material is shown in FIG. 10. As shown in FIG. 10, a rolling cutter 1030 may have a diamond table 1038 disposed on the upper surface of a carbide substrate 1031, such that the diamond table 1038 forms the cutting face 1032 of the rolling cutter. Alternatively, some embodiments may have a substrate and a cutting face made of the same material. For example, a rolling cutter may be formed entirely of diamond, such that the substrate and the cutting face are made of diamond. In such embodiments, the diamond may be fully or partially leached to remove the catalyst material from the interstitial regions of the diamond. Alternatively, a rolling cutter may have a cutting face made of a diamond-silicon-silicon carbide composite, or other thermally stable diamond composite. In another exemplary embodiment of a rolling cutter having a substrate and cutting face made of the same material, the rolling cutter substrate may be made of a carbide material, wherein the upper surface of the carbide substrate forms the cutting face.

The rolling cutter 430 may also have a side surface 435 formed around the circumference and extending the entire length of the rolling cutter 430. Thus, in embodiments having a cutting face made from a material that is different from the substrate, the side surface may include both substrate material and the cutting face material. Further, as shown in FIGS. 4A and 4B, a cutting edge 433 is formed at the intersection of the cutting face 432 and the side surface 435. The cutting edge may be formed from material that is the same as the substrate material or different from the substrate material. For example, the cutting edge may be formed from tungsten carbide, polycrystalline diamond, TSP, or other hard and/or wear resistant materials known in the art.

Further, the rolling cutter may be modified to have diamond material (e.g., polycrystalline diamond) at the cutting face and/or the cutting edge. A rolling cutter 430 having a cutting edge 433 of polycrystalline diamond 434, as shown in FIG. 4C, may have a carbide material (e.g., tungsten carbide) exposed on a portion of the cutting face 432 to enable easy and precise machining of the rolling cutter 430 to mate with a corresponding shaped retention end of a blocker. For example, FIG. 4C shows the exposed carbide portion of the cutting face having a concave portion 437. In other embodiments, the cutting face of a rolling cutter may be substantially planar.

Referring to FIGS. 4A-B, the rolling cutter 430 may be modified to have at least one groove 436 formed within the cutting face 432, the cutting edge 433, and/or the side surface 435. Grooves 436 may be included in the rolling cutters of the present disclosure to enhance rotation through hydraulic interactions or physical interactions with the formation. In various embodiments, grooves 436 may be etched or machined into the various components, or alternatively formed during sintering or formation of the component, and in some particular embodiments, may have a depth ranging from 0.001 to 0.050 inches. One of ordinary skill in the art would recognize the grooves may take any geometric or non-geometric shape and depending on the size of the cutting elements, it may be preferable to vary the depth of the grooves. Other features aiming to increase the drag force to rotate the cutter, such as holes, dimples, or raised volumes on the cutting face, chamfer or side surface, are all within the scope of the invention. Further, grooves may be formed in a symmetric or asymmetric manner around the longitudinal axis of the rolling cutter. For example, FIG. 4A shows a rolling cutter having grooves 436 formed axisymmetrically in the cutting face 432 near the cutting edge 433.

In addition to grooves, the cutting face 432 of a rolling cutter 430 may have a concave or convex portion. The terms "concave portion" and "convex portion" refer to a portion of a cutting face that has a concave or convex shape and is configured to correspond with the shape of an adjacent blocker. Although a concave portion may have a shape similar to or the same as the shape of a groove 436, a concave/convex portion differs in function and typically in size and location from grooves. In particular, a concave/convex portion may be formed to fit with the retention end of a corresponding blocker and may be generally located in the radial center of a cutting face. Alternatively, the concave/convex portion may be located anywhere on the cutting face without intersecting the cutting edge of the rolling cutter. Grooves may be formed around or near the edges of a cutting face to enhance rotation of the rolling cutter and are generally smaller than a concave/convex portion.

An example of a rolling cutter having both grooves and a concave portion is shown in FIGS. 4A-B to further clarify the differences between a groove and concave portion. In the embodiment shown in FIGS. 4A-B, a rolling cutter 430 has a concave portion 437 formed at or near the radial center of the cutting face 432 and smaller-sized grooves 436 formed around the cutting face 432 near the cutting edge 433. A blocker 440 positioned adjacent to the rolling cutter 430 on the leading face 421 of the blade 420 may be generally L-shaped and include a retention end 441 and an attachment end 445, wherein the retention end 441 is positioned adjacent to the concave portion 437 of the cutting face 432 of the rolling cutter 430 to retain the rolling cutter in the cutter pocket 425, and wherein the attachment end 445 is attached to a portion of the blade 420. Attachment end 445 may include a pin 448, which extends into a portion of the blade and beneath the rolling cutter 430. As shown in FIGS. 4A-B, the retention end 441 of the blocker 440 may have a convex portion 447, wherein the convex portion 447 mates with the concave portion 437 of the rolling cutter 430. Alternatively, in other embodiments, the cutting face may have a convex portion and the retention end of a blocker may have a concave portion such that the convex portion of the cutting face mates with the concave portion of the retention end.

Figure 5A:
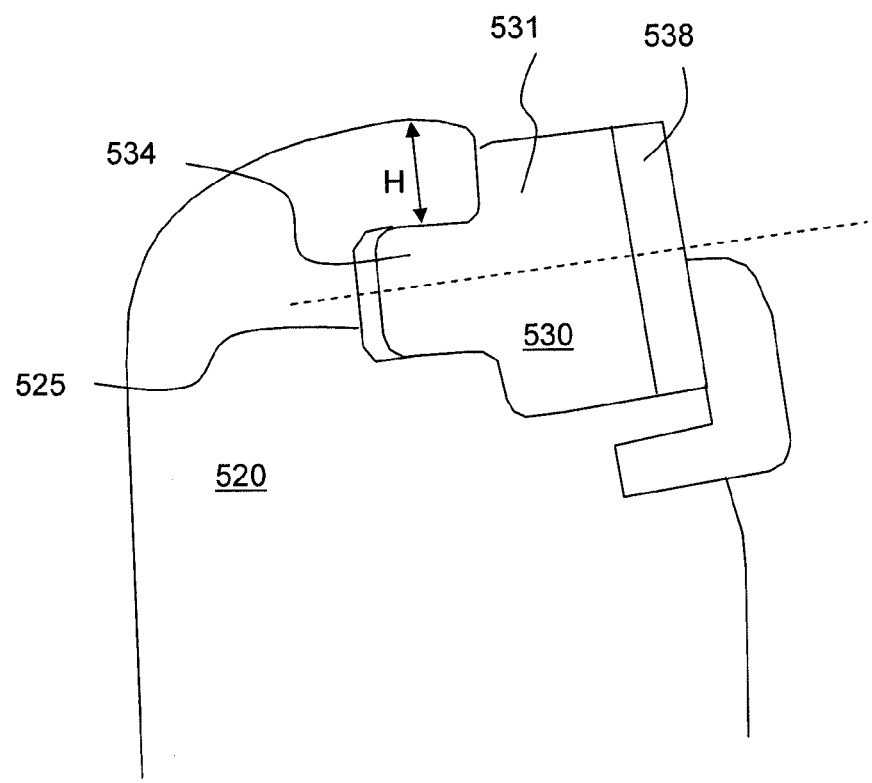
FIGS. 5A-C show cross-sectional views of other embodiments of the present disclosure.
Figure 5B:
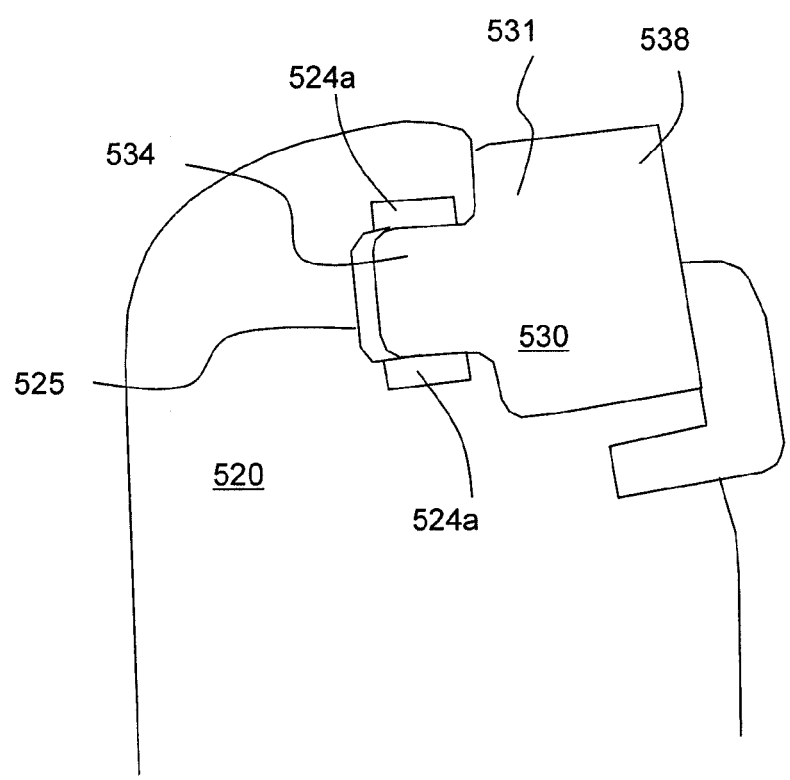
Figure 5C:
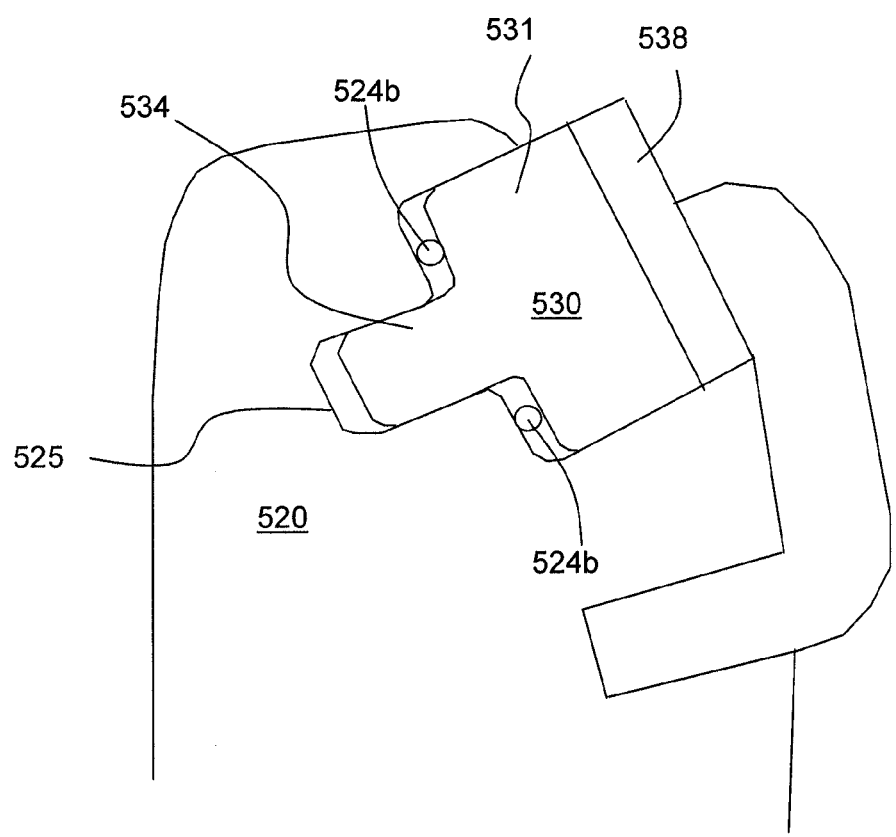

Further, rolling cutters according to the present disclosure may have substrates with various shapes. For example, as shown in FIGS. 5A-C, a rolling cutter 530 may have a diamond table 538 and a substrate 531, wherein the lower end of the substrate forms a shaft 534 having a smaller diameter than the rolling cutter. Thus, the thickness H of blade material between the lower end of the rolling cutter 531 and the top of the blade 520 is increased around the shaft 534. In some embodiments, the shaft 534 may be fitted into a bearing assembly 524 formed within the cutter pocket 525. For example, FIG. 5B shows the shaft 534 fitted within a roller bearing assembly 524a, and FIG. 5C shows the shaft 534 fitted within a ball bearing assembly 524b. In particular, FIG. 5C shows a plurality of ball bearings 524b disposed between the rolling cutter 530 and the cutter pocket 525 around the shaft 534. Ball bearings 524b may be used to reduce friction between the rolling cutter and the cutter pocket.

Figure 6:
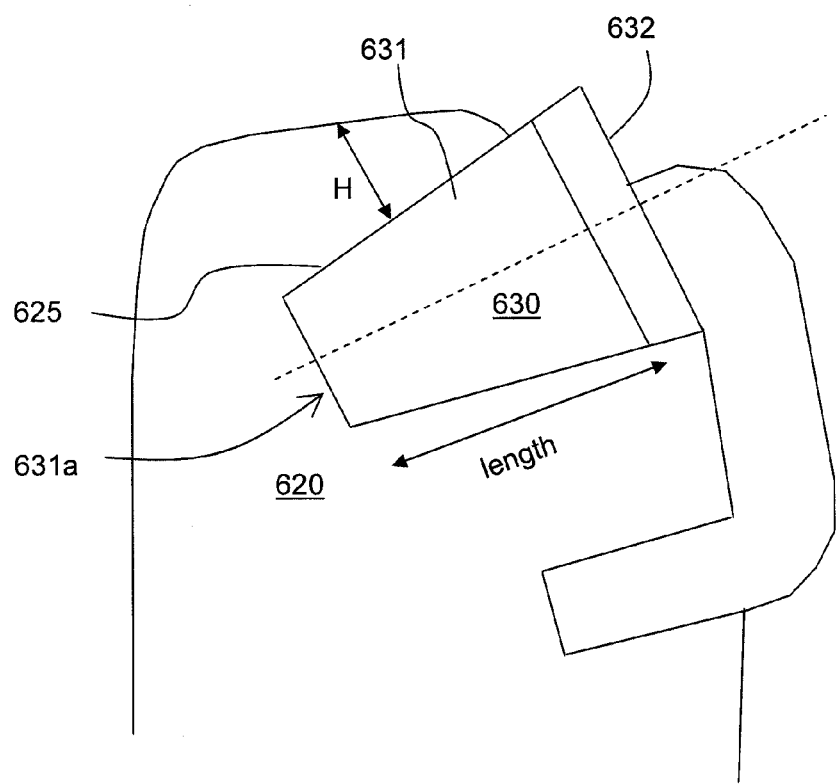
FIG. 6 shows a cross-sectional view of another embodiment of the present disclosure.

In another exemplary embodiment, as shown in FIG. 6, a rolling cutter 630 has a substrate 631 and a cutting face 632. The substrate 631 has a lower end 631a, opposite from the cutting face 632. The diameter of the substrate 631 decreases along at least a portion of the length of the substrate 631 such that the lower end 631a has a diameter smaller than the diameter of the cutting face 632. In some embodiments, the lower end of the substrate has a diameter smaller than about 90% of the diameter of the cutting face. In other embodiments, the lower end of the substrate has a diameter smaller than about 80% of the diameter of the cutting face. In yet other embodiments, the lower end of the substrate has a diameter smaller than about 70% of the diameter of the cutting face. Alternatively, a substrate may have a reduced diameter as described in U.S. Patent Application No. 61/479,183, which is herein incorporated by reference in its entirety. Reducing the size of the substrate toward the lower end allows for an increased amount of bit material around the rolling cutter, including an increased thickness H between the rolling cutter 630 and the top of the blade 620 and an increased distance between neighboring cutting elements. Advantageously, an increased amount of bit material surrounding the cutting elements may result in a more robust retention of the cutting elements.

Blockers

As referred to herein, a blocker is a component separate from a bit that is attached to the bit, adjacent to the cutting face of a rolling cutter. A blocker may include at least two functional portions: an attachment end, which acts as an attachment between the blocker and the bit, and a retention end, which is located adjacent to the cutting face of a rolling cutter to retain the rolling cutter within a cutter pocket. A blocker may be formed from various materials and have various shapes and sizes to prevent the rolling cutter from coming out of a cutter pocket formed in the bit.

Figure 7A:
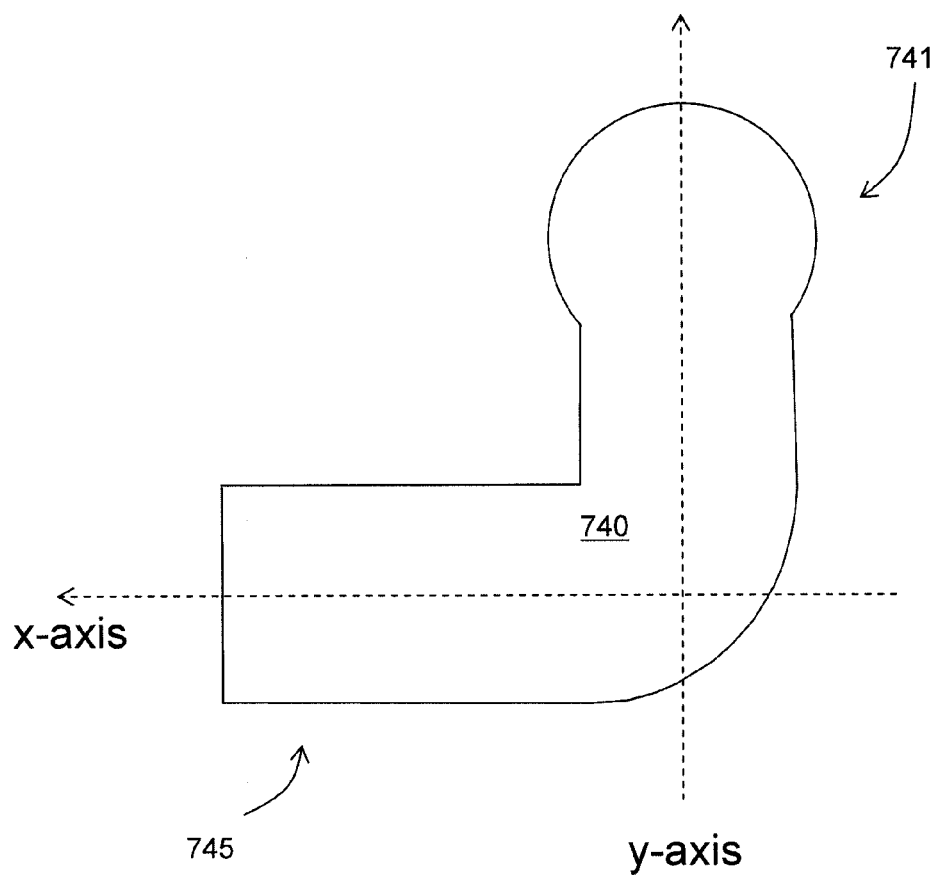
FIGS. 7A-E show blockers according to various embodiments of the present disclosure.

The shapes and sizes of blockers according to the present disclosure may be described in reference to the attachment end and retention end of each blocker, each extending in a plane of a coordinate system. For example, referring to FIG. 7A, a blocker 740 may be described using a conventional x-y coordinate system, wherein the retention end 741 extends along the y-axis and the attachment end 745 intersects the retention end 741 at an approximately 90° angle, extending along the x-axis to form an L-shape. Alternatively, an attachment end may intersect with a retention end at an acute angle (i.e., extend at an angle above the x-axis) or an obtuse angle (i.e., extend at an angle below the x-axis). In other embodiments, the attachment end may extend along a z-axis or at an angle there from. In yet other embodiments, the retention end and attachment end of a blocker may be in the same plane (e.g., the attachment end and retention end both extend along the y-axis, intersecting at a 180° angle) to form a straight pin. Depending on the reciprocating place of attachment on the bit, the attachment end of a blocker may extend in various directions from the retention end of the blocker.

Figure 7B:
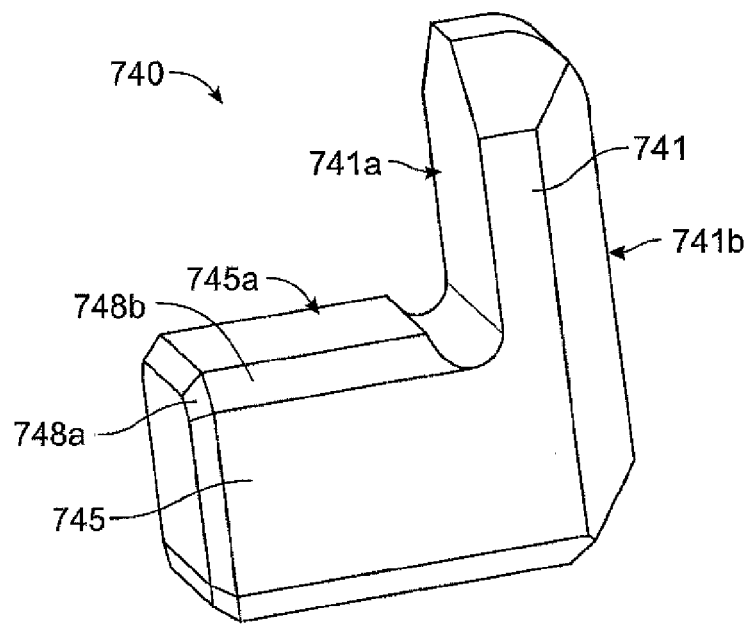
Figure 7C:
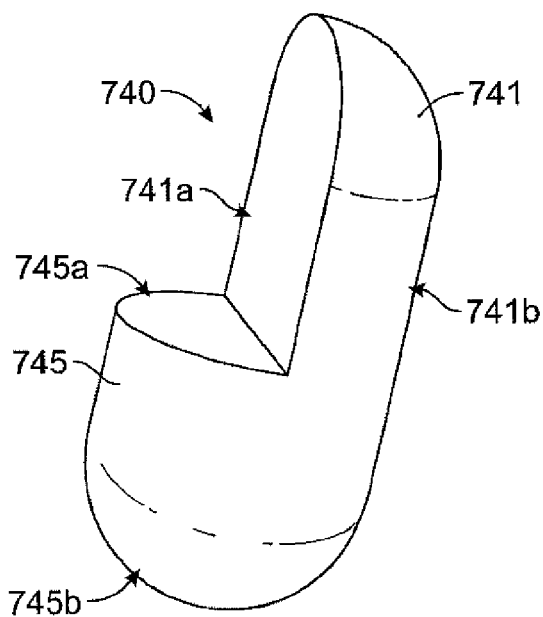
Figure 7D:
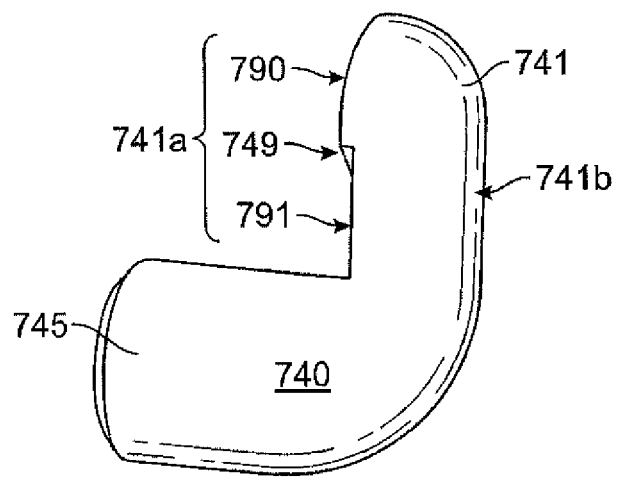

FIGS. 7B-D show other exemplary geometries of blockers. In FIG. 7B, blocker 740 has a retention end 741 and an attachment end 745 (i.e., the part of the blocker that is attached to the drill bit) with different shapes and sizes. In particular, the inner surface 741a of the retention end 741 (which will interface a cutting face of a rolling cutter) is flat and the outer surface 741b of the retention end 741 has beveled edges 748a and beveled corners 748b, while all surfaces of the attachment end have beveled edges 748a and beveled corners 748b. Alternatively, as shown in FIG. 7C, the inner surface 741a of the retention end 741 may be flat and the outer surface 741b of the retention end 741 may have rounded edges 748a and rounded corners 748b, while the upper surface 745a of the attachment end 745 may be flat and the lower surface 745b of the attachment end 745 may have rounded edges 748a and rounded corners 748b.

Figure 7E:
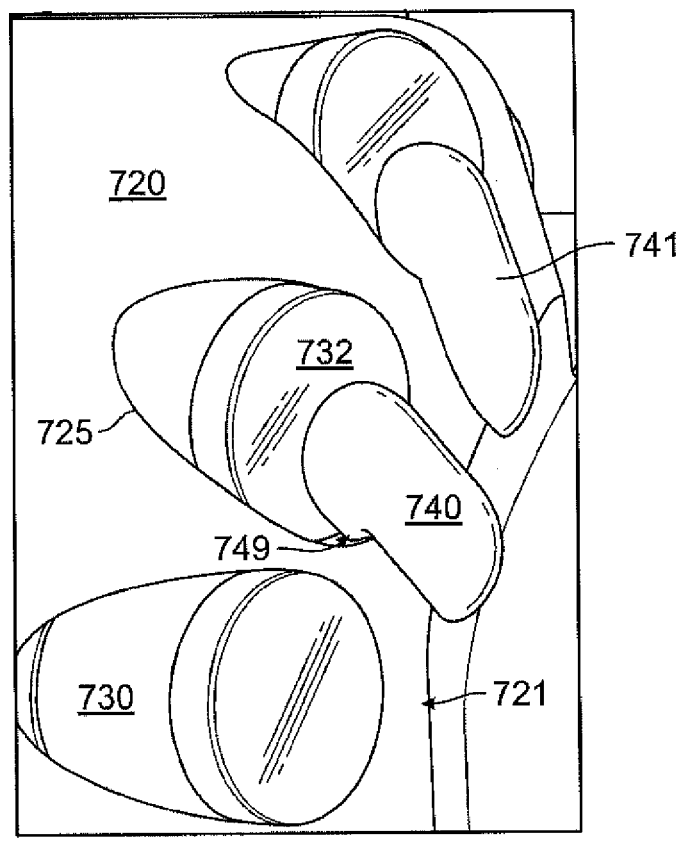

Further, FIGS. 7D and 7E show another exemplary embodiment of a blocker having a cylindrically shaped attachment end 745 and a retention end 741 with a rounded outer surface 741b to provide better hydraulics between the flow of drilling mud and the bit. The inner surface 741a of the retention end 741 in the embodiment shown in FIGS. 7D and 7E has two flat surfaces (a top flat surface 790 and a bottom flat surface 791) divided by a step 749. In such an embodiment, a rolling cutter 730 is set within a cutter pocket 725 such that the cutting face 732 of the rolling cutter 730 is a distance from the leading face 721 of the blade 720 (i.e., the cutting face is not flush with the leading face of the blade). The step 749 of the blocker 740 is configured to fit within the distance between the cutting face 732 of the rolling cutter 730 and the leading face 721 of the blade 720, such that the top flat surface 790 is immediately proximate to the cutting face 732 and the bottom flat surface 791 is immediately proximate to the leading face 721 upon attachment of the blocker 740 to the blade 720.

As shown in FIGS. 7A-E, the attachment end 745 may intersect with the retention end 741 at a 90° angle, wherein an upper surface 745a of the attachment end 745 is positioned beneath the rolling cutter upon attachment into a cavity in the bit. Further, in various embodiments of the present disclosure, the retention end of a blocker may have a smaller or larger volume than the attachment end, or the retention end and attachment end of a blocker may have substantially equal volumes.

According to embodiments of the present disclosure, the attachment end of a blocker may be configured to have a thickness to minimize breakage during drilling. For example, cylindrically shaped attachment ends may have a diameter in a range of about 0.1 to 0.5 inches. Further, the attachment end may have a length less than or equal to the length of the rolling cutter. Additionally, the size of the retention end of a blocker may be characterized by the percentage of the cutting face area that it covers. For example, the retention end of a blocker may cover up to about 80 percent of the cutting face of a rolling cutter. In a more particular embodiment, the retention end of a blocker may cover less than about 50 percent of the cutting face of a rolling cutter and less than about 30 percent in an even more particular embodiment.

Further, blockers according to the present disclosure may have different means of contacting the retention end of the blocker with the cutting face of a rolling cutter. For example, in some embodiments, a blocker may rigidly contact the cutting face of a rolling cutter (i.e., the retention end of a blocker does not move with respect to the attachment end of the blocker). In other embodiments, a blocker may flexibly contact the cutting face of a rolling cutter (i.e., the blocker is designed to allow at least some movement of the retention end of a blocker with respect to the attachment end of the blocker). In either embodiment, the rolling cutter may have some amount of axial movement within the cutter pocket.

Figure 8:
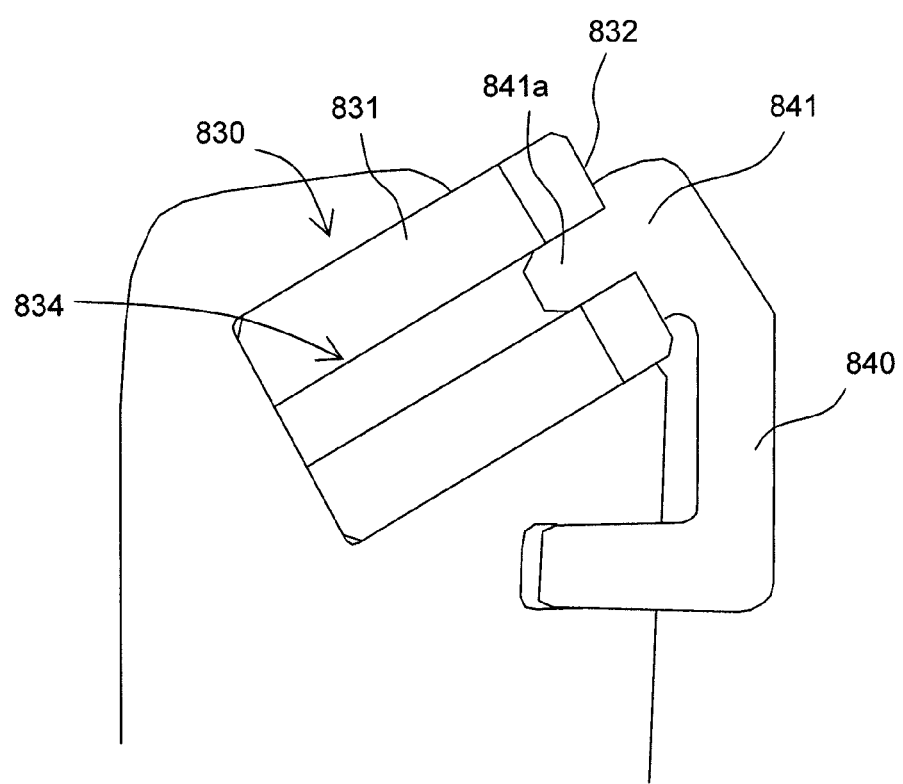
FIG. 8 shows a cross-sectional view of an exemplary embodiment of the present disclosure.

Exemplary embodiments of blockers rigidly contacting the cutting face of a rolling cutter have been described thus far, for example, in reference to FIGS. 3A-6. In such embodiments, the retention end of a blocker does not move with respect to the attachment end of the blocker, and the retention end contacts the cutting face of a rolling cutter such that the rolling cutter may not move substantially along its longitudinal axis within the cutter pocket unless the depth of the rolling cutter is less than the length from the back wall of the cutter pocket to the inner surface of the retention end. For example, referring back to FIGS. 4A-C, the retention end 441 of a blocker 440 rigidly contacts the cutting face 432 of a rolling cutter 430. In particular, the retention end 441 of the blocker 430 has a spherical shaped end 447 that mates with a concave portion 437 formed within the cutting face 432. The spherical end 447 does not move with respect to the attachment end 445. Further, the spherical end 447 mates with the concave portion 437 (i.e., the retention end is immediately proximate to the cutting face) such that the rolling cutter 430 may not move substantially along its longitudinal axis. Another exemplary embodiment of a blocker rigidly contacting a cutting face is shown in FIG. 8. As seen in FIG. 8, a rolling cutter 830 may have an internal bore 834 extending through the cutting face 832 and substrate 831, wherein a portion of the retention end 841 of a blocker 840 mates with a portion of the internal bore 834. In such an embodiment, the portion of the retention end 841 of the blocker 840 that mates with a portion of the internal bore 834 may form an insert 841*a* that extends a distance into the internal bore 834.

Figure 9:
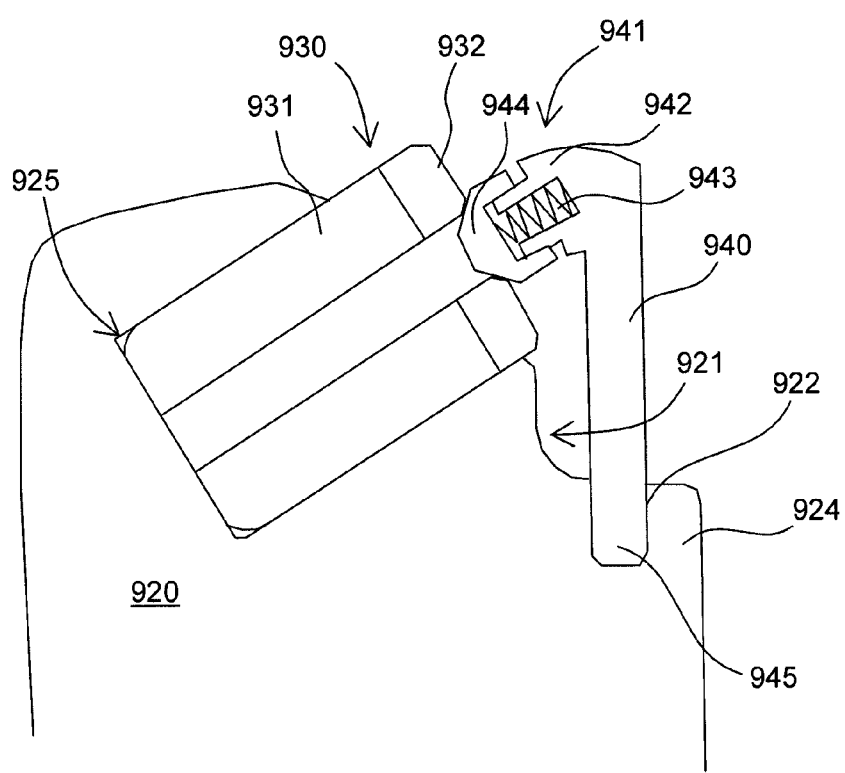
FIG. 9 shows a cross-sectional view of another exemplary embodiment of the present disclosure.

In other exemplary embodiments, a blocker may flexibly contact the cutting face of a rolling cutter through a spring connection assembly, for example. A spring connection assembly, as referred to herein, may include a series of components, including a spring and a component that contacts the rolling cutter, wherein a flexible connection is provided between the blocker and the cutting face of a rolling cutter. For example, as seen in FIG. 9, the retention end 941 of a blocker 940 may have a blocker head 942, a spring 943, and a contacting piece 944, wherein the contacting piece 944 contacts the cutting face 932 of the rolling cutter 930. The spring 943 may be used to keep the rolling cutter 930 in contact with the side and the bottom of the cutter pocket 925 to reduce any hammering effect that may occur between the rolling cutter 930 and the cutter pocket 925 during drilling. Different spring types and configurations may be used to keep the rolling cutter and pocket surfaces in constant contact. For example, a retention end of a blocker may have at least one resilient member used to push the rolling cutter to the bottom side and end of the cutter pocket. Further, the springs used in spring connection assemblies may have different spring constants, shapes, sizes, etc.

Figure 16:
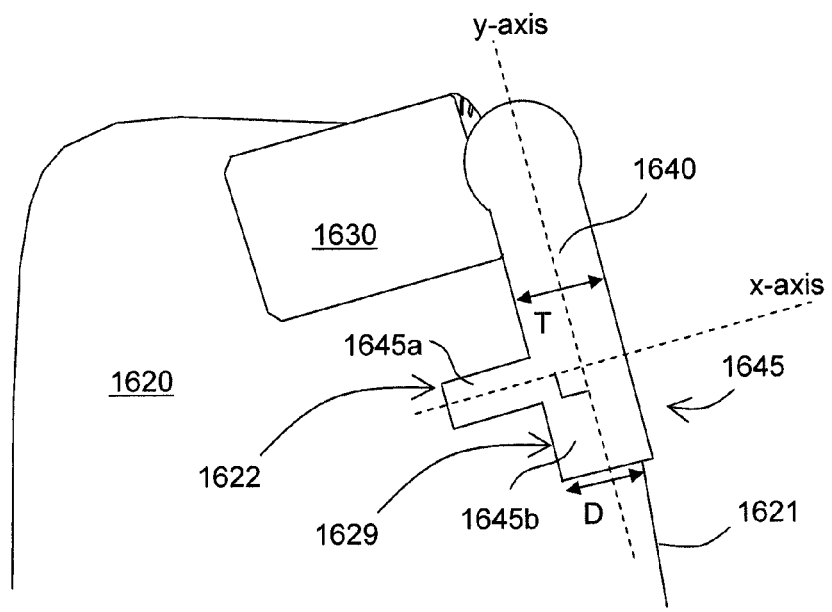
FIG. 16 shows a cross-sectional view of an exemplary embodiment of the present disclosure.

Blockers according to the present disclosure may be attached to the drill bit by various means. For example, referring back to FIGS. 3A-B, the attachment end 345 of a blocker 340 may be attached to a portion of the blade 320 by inserting the attachment end 345 of the blocker 340 into a cavity 322 formed within the leading face 321 of the blade 320 below the cutter pocket 325. The attachment end 345 may be held within the cavity 322 by mechanically attaching (e.g., interference fitting, or over fitting) and/or by brazing the attachment end 345 to the leading face 321 of the blade 320. It is within the scope of the present disclosure that the attachment end of a blocker may be fitted within and/or attached to a blade using a variety of shapes of attachment ends. For example, FIG. 16 shows another exemplary configuration of a blocker 1640 having an attachment end 1645 brazed into a mating cavity 1622 to retain a rolling cutter 1630 in a blade 1620. As shown in FIG. 16, the attachment end 1645 of the blocker 1640 has two segments, a first segment 1645*a* extending into the blade 1620 and second segment 1645*b* extending along a portion of the leading face 1621 of the blade 1620. Referring back to the coordinate system used above to describe blockers, the first segment 1645*a* may also be said to extend in along an x-axis and the second segment 1645*b* along a y-axis, such that the first and second segments intersect at a 90° angle. In other embodiments according to the present disclosure, the attachment end of a blocker may be formed from one or more segments extending in one or more directions, including for example, two or more segments intersecting at obtuse or acute angles.

Figure 12A:
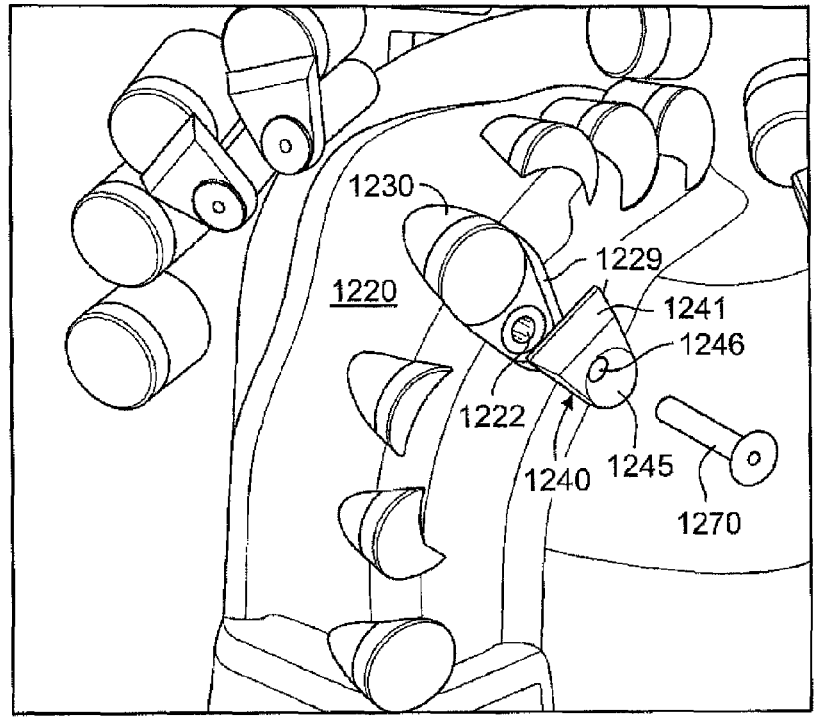
FIGS. 12A-C show expanded views and a cross-sectional view of other embodiments of the present disclosure.
Figure 12B:
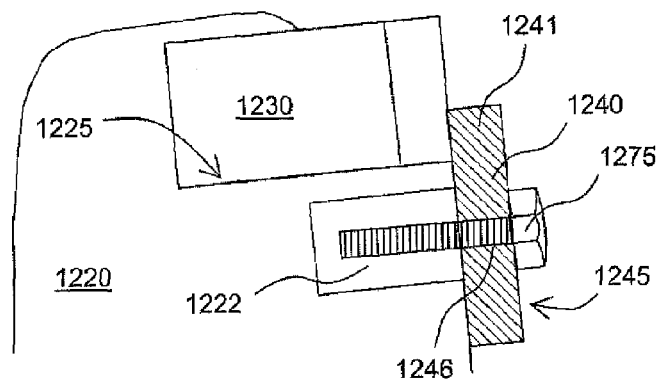
Figure 13A:
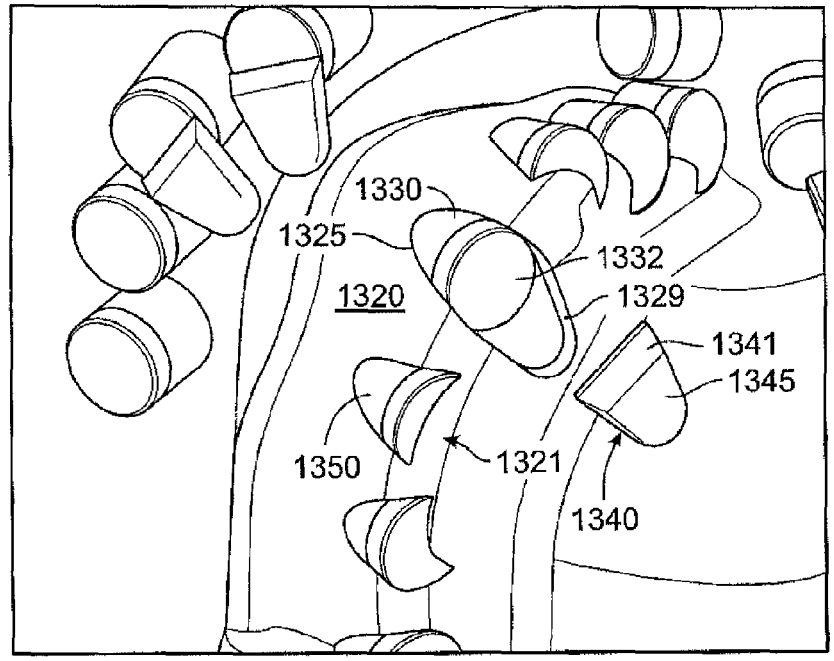
FIGS. 13A-C show an expanded view, a cross-sectional view, and a front view of other embodiments of the present disclosure.

Also shown in FIG. 16, the blocker 1640 is set within an inset 1629 formed in the blade 1620. The inset 1629 is formed separate from the cavity 1622 and extends a distance D into the leading face 1621 of the blade 1620. For example, as seen in FIG. 16, the cavity 1622 extends into the blade 1620 whereas the inset 1629 extends along the leading face of the blade 1620. Further, the thickness T of the blocker 1640 is greater than the distance D of the inset formed in the blade 1620, such that the blocker 1640 protrudes away from the leading face 1621 of the blade 1620. Other embodiments of the present disclosure may have blockers with thicknesses T equal to inset distances D, such that the blocker is flush with the leading face of the blade or alternatively, blockers may have a thickness T that is less than the inset distance D. FIGS. 12A-B and 13A, which will be described in more detail below, also show blades having insets formed therein.

As shown in FIG. 10, the attachment end 1045 of a blocker 1040 may be attached to a portion of the leading face 1021 of the blade 1020 by a screw. In some embodiments, the threaded cavity 1022 may be formed by brazing a threaded wall piece (e.g., a threaded nut) within a cavity 1022. In other embodiments, the threaded cavity 1022 may be built into the blade by infiltration or threads may be machined into the bit body if the bit body material is machinable.

In various embodiments, threaded cavities may be formed at different orientations within the blade, which may be described in reference to the coordinate system mentioned above or in reference to the rolling cutter and blade. For example, a threaded cavity may be formed parallel with a side of a cutter pocket within a blade (i.e., the threaded cavity may extend along an x-axis). In some embodiments, a threaded cavity may be formed at an angle perpendicular to the leading face of a blade (i.e., extending only along the x-axis). Alternatively, a threaded cavity may be formed at an angle less than or greater than 90° such that the threaded cavity extends within the x-axis plane and the y-axis plane. In other embodiments, the threaded cavity may be formed at an angle away from the x-axis such that the threaded cavity extends within the x-axis plane and the z-axis plane.

Figure 11A:
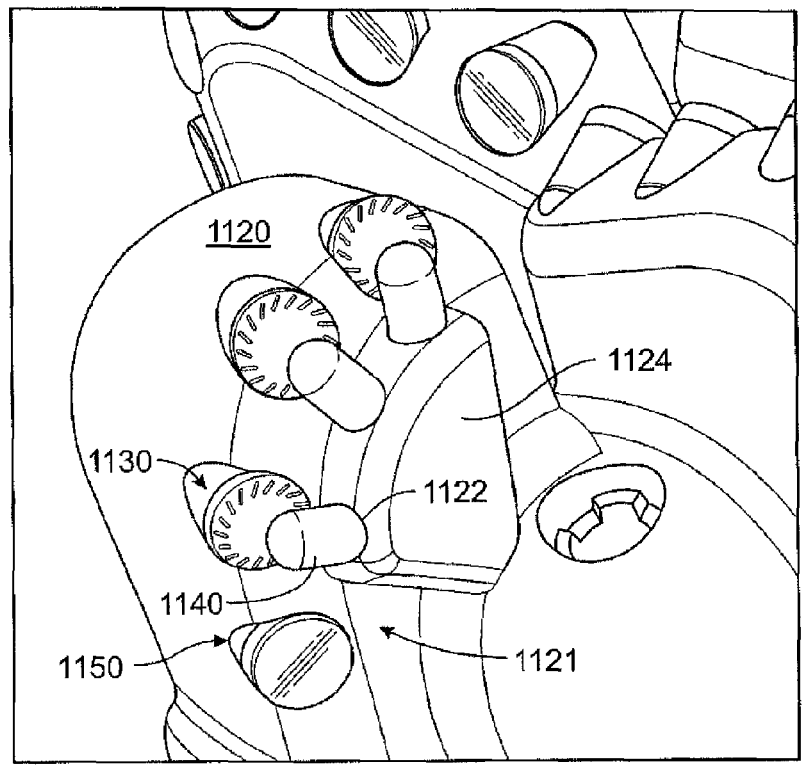
FIGS. 11A-B show a side view and a cross-sectional view of other exemplary embodiments of the present disclosure.

In embodiments according to the present disclosure, a blade may have at least one protrusion formed on the leading face of the blade such that the leading face of the blade is not flat. In such embodiments, the attachment end of a blocker may be attached to a protrusion formed on the leading face of a blade. For example, as shown in FIG. 11A, the attachment end of a blocker 1140 may be inserted into a vertical cavity 1122 formed within a protrusion 1124 on the leading face 1121 of a blade 1120. Further, more than one vertical cavity may be formed to receive blockers in a single protrusion formed on a blade. Alternatively, more than one protrusion may be formed on a blade, each protrusion having one or more vertical cavities formed therein to receive one or more blockers. Referring back to FIG. 9, FIG. 9 further shows a cross sectional view of an attachment end 945 of a blocker 940 inserted into a vertical cavity 922 formed within a protrusion 924 on the leading face 921 of the blade 920. The attachment end of a blocker may be brazed, threaded, over fitted, or a combination of such methods into the vertical cavity. In such embodiments, the cutting face is approximately flush with the blade material immediately below the cutter pocket, and the protrusion extends forwardly (into the direction of the rotation of the bit) a distance at least sufficient to accommodate the attachment end of the blocker.

Figure 11B:
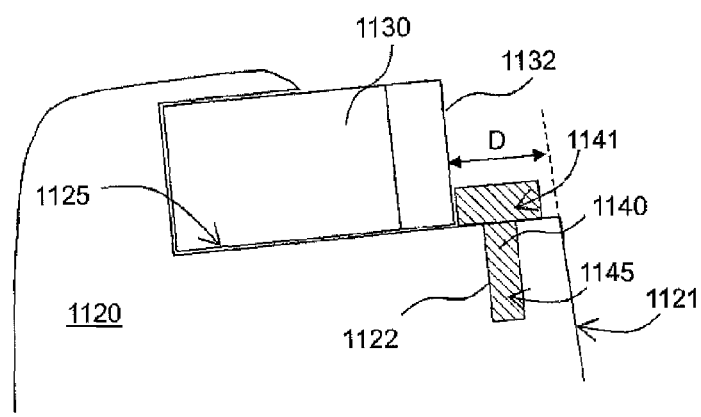

In other embodiments, a blocker may have an attachment end that is inserted vertically into a blade that does not have a protrusion. Rather, the leading face of a blade may extend a distance forward from the cutting face of a rolling cutter (i.e., the blade material adjacent the rolling cutter is not flush with the cutting face of the rolling cutter) such that a vertical cavity may be formed within the distance of the blade between the cutting face and the leading face. For example, FIG. 11B shows a cross-sectional view of a blocker 1140 that is inserted into a vertical cavity 1122 formed within the blade 1120 between the cutting face 1132 of a rolling cutter 1130 and the leading face 1121 of the blade 1120. In such an embodiment, the rolling cutter 1130 may be disposed within a cutter pocket 1125 such that the cutting face 1132 is a distance D inward from the leading face 1121 of the blade 1120. A cavity 1122 may be formed within the distance D portion of the blade 1120 extending vertically into the blade (i.e., along a y-axis). The blocker 1140 shown in FIG. 11B is formed from a capped screw, wherein the retention end 1141 of the blocker 1140 is the cap of the screw. The retention end 1141 is proximate to the cutting face 1132 of the rolling cutter and sits on top of the distance D portion of the blade 1120 to retain the rolling cutter 1130 within the cutter pocket 1125.

According to yet another exemplary embodiment of the present disclosure, a blocker may be attached to a blade via a pin, screw or bolt inserted through a hole in the attachment end of the blocker and into a cavity formed in the blade. For example, as seen in FIGS. 12A and 12B, a blocker 1240 may have a retention end 1241 and an attachment end 1245, wherein the attachment end 1245 has a hole 1246 therein. Further, a screw 1270 or a bolt 1275 may be inserted through the hole 1246 and threaded into a threaded cavity 1222 formed within the leading face 1221 of the blade 1220. The threaded cavity 1222 may include a steel nut that has been infiltrated into the bit body, wherein threads may be machined in the inside of the nut before or after infiltration, or just machined into the bit body as mentioned above. If threads are machined into the nut before infiltration, materials such as graphite may be used to protect the structure of the hole and threads during the infiltration process.

Figure 12C:
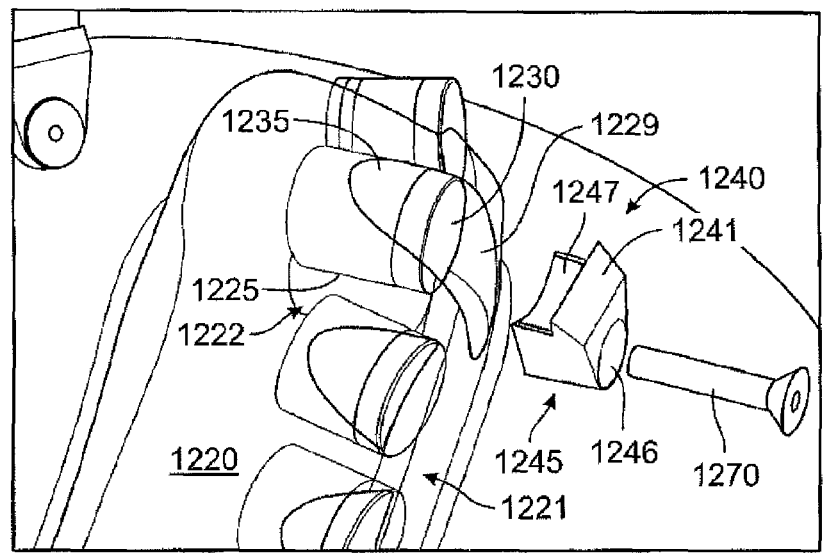

In some embodiments, as shown in FIGS. 12A and 12B, the attachment end 1245 may extend only in a vertical direction (i.e., along a y-axis), and in other embodiments, as shown in FIG. 12C, the attachment end 1245 may extend along an x-axis into the blade. Referring to FIG. 12C, the attachment end 1245 has a curved upper surface 1247 that corresponds to the shape of a rolling cutter 1230 and fits within a portion of the blade, such that the upper surface 1247 of the attachment end 1245 forms a portion of a cutter pocket 1225 and bit body. Alternatively, the attachment end 1245 may have a shell-type structure, wherein the upper surface 1247 of an attachment end 1245 sits over a portion of the cutter pocket 1225 to form a portion of the cutter pocket surface. In particular, the upper surface 1247 of the attachment end 1245 extends a length along the rolling cutter side surface 1235 and contacts a portion of the cutter pocket 1225. This surface may extend at least ⅓ of the length of the rolling cutter in some embodiments, at least ½ in another embodiment, and up to the entire length in yet another embodiment. In embodiments where the upper surface of an attachment end forms part of the cutter pocket, the upper surface of the attachment end may act as a bearing, wherein at least a portion of the upper surface is formed of hard materials such as WC, diamond, diamond-like coatings, TiC, TiAlN, etc.

In addition to having a screw 1270 inserted through a hole 1246 and threaded cavity 1222, the attachment end 1245 may also fit within an inset 1229 formed in the blade 1220. In particular, a hole 1246 may be formed through the attachment end 1245, wherein a screw 1270 may be inserted through the hole 1246 and screwed into a threaded cavity 1222 formed within the leading face 1221 of the blade 1220. The attachment end 1245 may fit within the inset 1229 such that the attachment end 1245 is flush with the leading face 1221 of the blade 1220. Alternatively, the attachment end may protrude from the leading face 1221 or may be recessed within the leading face 1221. Further, the attachment end of the blocker may be brazed or mechanically fixed into the blade 1220.

Figure 19A:
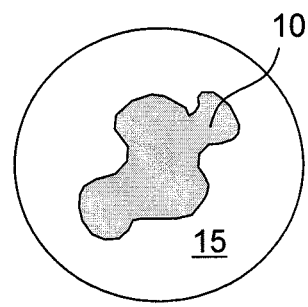
FIGS. 19A-C show front views of various exemplary screw heads according to embodiments of the present disclosure.
Figure 19B:
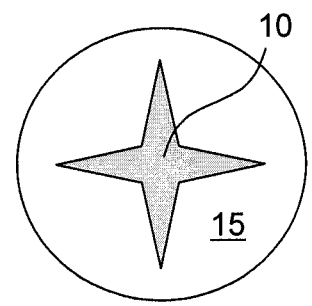
Figure 19C:
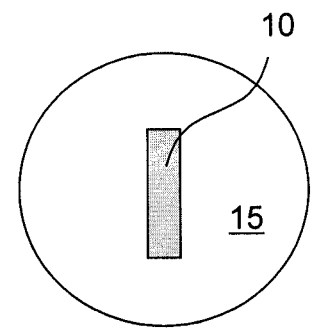

A screw or bolt used as to attach the attachment end of a blocker to the blade may have different shapes and sizes. For example, the head of a screw may have a uniquely shaped indention that corresponds to a tool with a similarly shaped protrusion used to tighten the screw into a threaded cavity. In other embodiments, the head of a screw may correspond to a Phillips or straight screw-tightening tool or other conventional tightening tool (e.g., flat-head screwdriver, Phillips screwdriver, Allen wrench, etc.). FIGS. 19A-C show top views of various examples of shaped indents 10 that may be formed within the head 15 of a screw. In particular, FIG. 19A shows a uniquely shaped indentation 10, FIG. 19B shows a Phillips shaped indentation, and FIG. 19C shows a rectangular indentation 10 (which may be used with a flat-head screwdriver). One having ordinary skill in the art may appreciate that indentations formed in the head of a screw may have shapes other than the ones shown in the figures.

Figure 18:
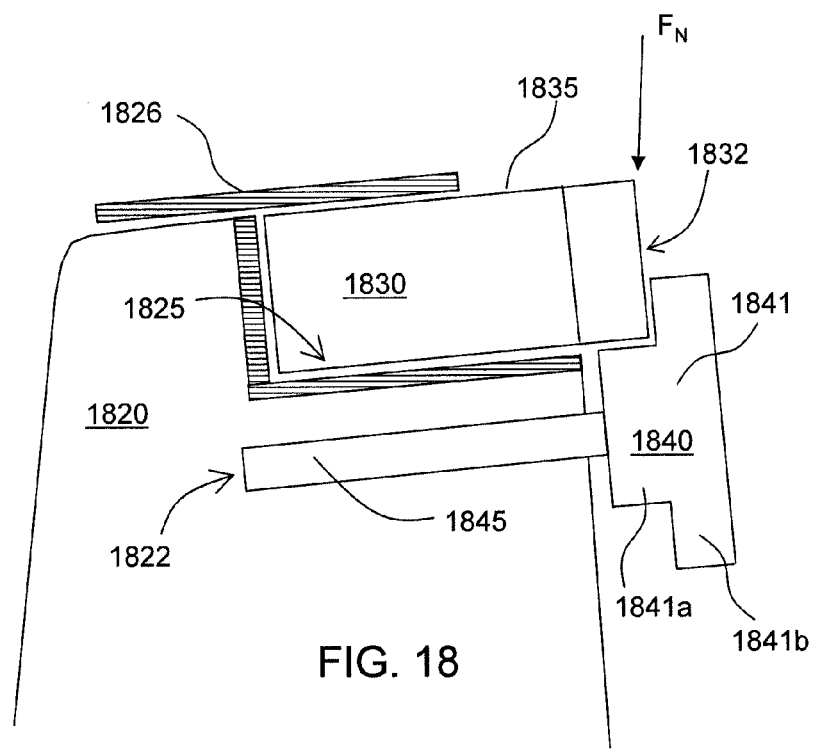
FIG. 18 shows a cross-sectional view of an embodiment of the present disclosure.

Further, an attachment end of a blocker may form a shaft which is inserted into a cavity formed within a blade, wherein the shaft attachment end may act as an axis of rotation for a retention end mounted thereon. In such embodiments, the retention end may continue to cover a portion of the cutting face of a rolling cutter as it rotates about the attachment end. Referring now to FIG. 18, a cross-sectional view of an exemplary rolling cutter assembly having a rotatable retention end is shown. In particular, a blocker 1840 has a retention end 1841 and an attachment end 1845. The attachment end 1845 has a cylindrical shape, which acts as a mounting shaft for the retention end 1841 to rotate about. The attachment end 1845 may be inserted into a cavity 1822 formed within the blade 1820 and brazed or mechanically attached therein, for example by interference fit or by a threaded connection as described above. The retention end 1841 may have a disc shape, wherein the retention end 1841 is mounted to the attachment end 1845 at or near the radial center of the disc. Specifically, the retention end 1841 shown in FIG. 18 has a shape equal to a shape formed by stacking two discs, a smaller disc 1841a and a larger disc 1841b positioned concentrically over the smaller disc 1841a. The circumference of the smaller disc 1841a rotates along the outer side surface 1835 of a rolling cutter 1830, while the larger disc 1841b rotates over a portion of the cutting face 1832 of the rolling cutter 1830. In such an embodiment, the smaller disc 1841a part may act as a support for a rolling cutter that extends a distance from the cutter pocket 1825 and leading face of the blade 1820 and that is subjected to a normal force $F_N$ at the front of the rolling cutter. The rotating retention end 1841 may also decrease the amount of friction experienced by the rolling cutter 1830 with its support member (e.g., the smaller disc part of the retention end). In other embodiments, the rotatable retention end may be shaped as a single disc that continuously covers a portion of the rolling cutter as it rotates about the attachment end.

Alternatively, a rolling cutter assembly may include a retention mechanism that extends through a rolling cutter. In such embodiments, a rolling cutter may have a bore that extends through the rolling cutter along the longitudinal axis, as shown in FIG. 8, for example. However, in this embodiment, the retention mechanism does not attach to the bit body at a location radially exterior to the rolling cutter, but at a location that is within the radius of the rolling cutter. Thus, the retention component is inserted through the bore, and thereby attached to the bit to retain the rolling cutter. The retention component may include one or more pieces.

Figure 20A:
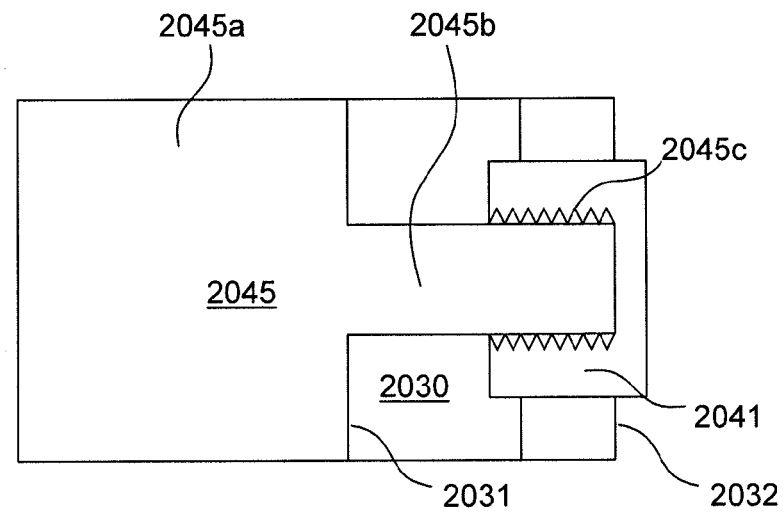
FIGS. 20A-D show cross-sectional views and a front view of embodiments according to the present disclosure.
Figure 20B:
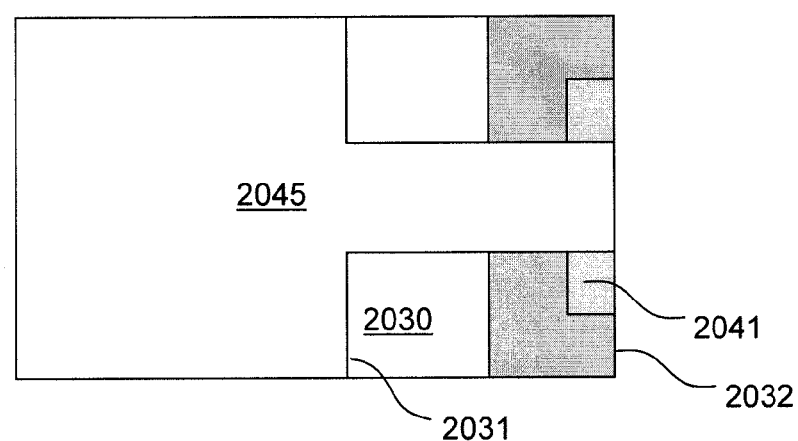
Figure 20C:
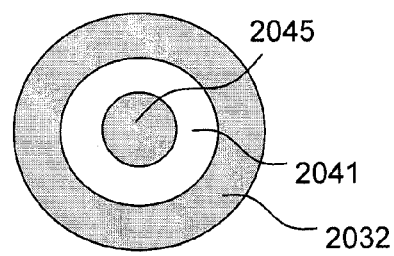

Referring now to FIG. 20A, a body (either the bit body or a separate body brazed to the bit body) 2045 has a base 2045a and a shaft 2045b, and a rolling cutter 2030 having a bore extending there through is positioned over the base 2045a and around the shaft 2045b of the body 2045. The shaft 2045b may have a threaded end 2045c opposite from the base 2045a. A retention mechanism 2041 may be a threaded cap, which is attached to the body 2045 by screwing the retention mechanism 2041 to the threaded end 2045c of the shaft 2045b. Alternatively, as shown in FIG. 20B (cross-section view) and FIG. 20C (front view), the retention mechanism 2041 may be in the shape of a disc with a hole through the radial center, wherein the retention mechanism 2041 may be brazed to the shaft 2045b of the body 2045. Although the embodiment shown in FIGS. 20B and 20C shows the retention mechanism attached to the shaft by brazing alone, a retention mechanism may be attached to the shaft by other means of attachment, including for example, using a threaded connection in combination with brazing. In yet other embodiments, the retention mechanism may extend through the rolling cutter to be attached to the bit body by threadably attaching the retention mechanism within a cavity in the back wall of the cutter pocket. For example, referring to FIG. 20D, a retention mechanism has a shaft 2045 extending from a head 2041, wherein the base 2045a of the shaft 2045 has a threaded end that may screw into a bit. The retention head 2041 may be a screw head (such as those shown in FIGS. 19A-C) that has a larger diameter than the shaft 2045. The rolling cutter may be secured to a bit by placing the cutting element 2030 within a bit cutter pocket, inserting the retention screw through the bore in the cutting element 2030, and screwing the retention screw into the bit so that the base 2045a of the shaft 2045 has a threaded connection with the bit.

Figure 20D:
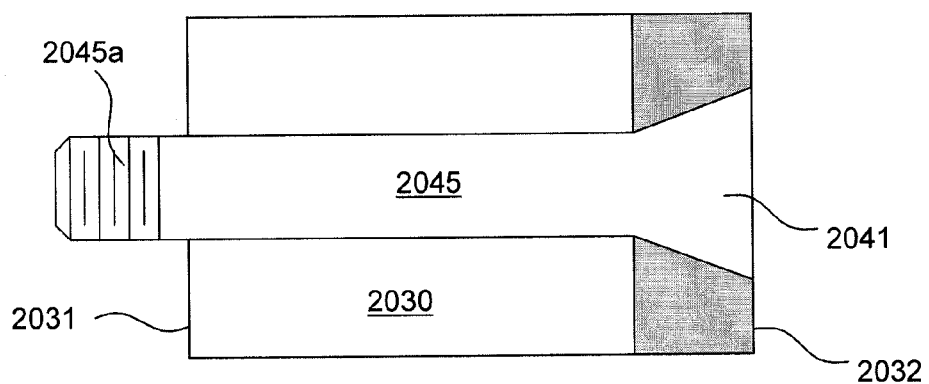

Further, as shown in FIGS. 20A, 20B and 20D, the bore extending through the cutting element 2030 may have a diameter larger at the cutting face 2032 end of the cutting element than at the lower end 2031 of the cutting element. By providing a larger bore diameter at the cutting face end of the cutting element 2030, a retention mechanism 2041 may retain the rolling cutter in the pocket. This retention mechanism may fit within the larger bore diameter at the cutting face of a cutting element and be flush with the cutting face (e.g., shown in FIGS. 20B and 20D) so no amount of the cutting face is covered by the retention mechanism, or alternatively, the retention mechanism can extend over a portion of the cutting face (e.g., shown in FIG. 20A).

Figure 13B:
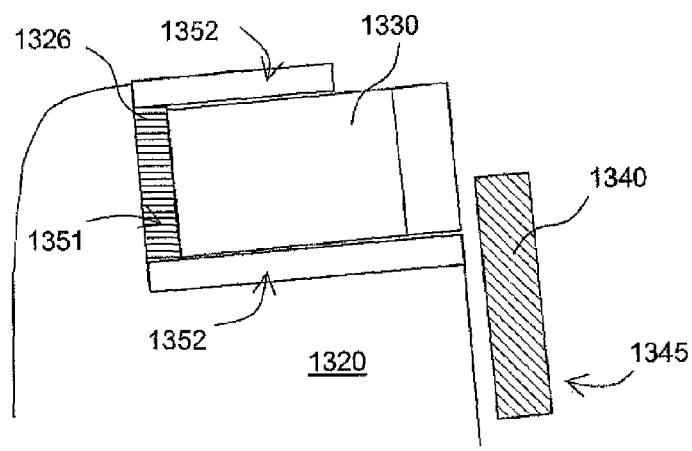
Figure 13C:
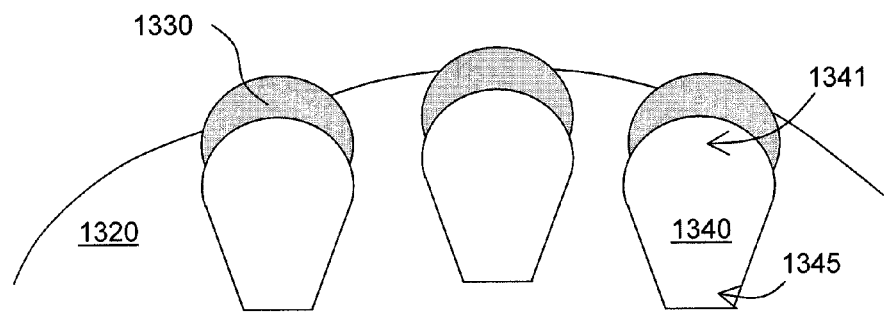

In yet other embodiments, a blocker may be attached to a blade by methods other than inserting an attachment end of the blocker into a cavity formed within the blade. For example, a blocker may be brazed directly to the leading face of a blade. Exemplary embodiments having blockers brazed directly to the leading face of a blade are shown in FIGS. 13A-C. As seen in FIG. 13A, an inset 1329 is formed within the leading face 1321 of a blade 1320, below a cutter pocket 1325 and rolling cutter 1330. An inset, as referred to herein, is separate from a cavity in that an inset extends along the leading face of a blade (i.e., substantially parallel with the leading face of the blade) and may terminate or open into the cutter pocket, whereas a cavity extends a distance within the blade (i.e., substantially perpendicular to a surface of the blade) and may be spaced a distance from the cutter pocket. A blocker 1340 may have a retention end 1341 and an attachment end 1345, wherein the attachment end 1345 fits within the inset 1329 and the retention end 1341 covers a portion of the cutting face 1332 of the rolling cutter 1330. The blocker 1340 may then be brazed into the inset 1329. In other embodiments, an attachment end of a blocker may be attached to a blade that does not have an inset formed therein. For example, FIG. 13B shows a cross-sectional view and FIG. 13C shows a front view of an embodiment having a blocker 1340 brazed to the leading face of a blade 1320. In particular, the attachment end 1345 of a blocker 1340 may be brazed to a flat surface of the leading face of a blade 1320 such that the retention end 1341 covers a portion of the rolling cutter 1330. Advantageously, the attachment end of a blocker may be torch brazed to the leading face of a blade to keep heat away from the rolling cutter.

Figure 22:
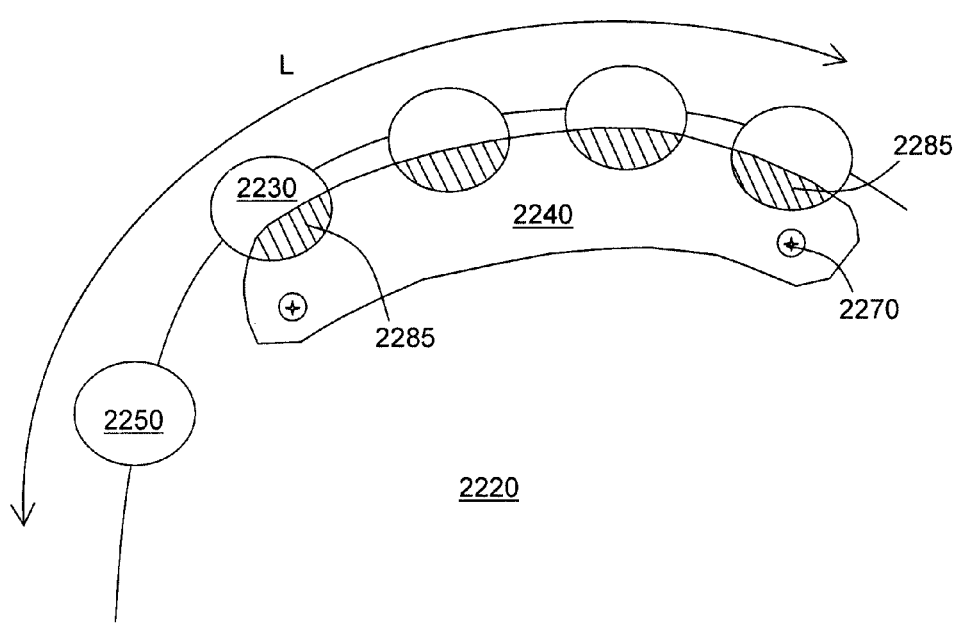
FIG. 22 shows a front view of another exemplary embodiment according to the present disclosure.

Furthermore, in some embodiments, a single blocker may be attached to the leading face of a blade, wherein the blocker extends a length along the blade to cover a portion of more than one rolling cutter. For example, referring to FIG. 22, a blocker 2240 extends along a portion of the length L of the blade 2220 such that it covers a portion 2285 of at least more than one rolling cutter 2230, but does not cover the fixed cutter 2250. The blocker 2240 may be screwed into the blade 2220 using at least one screw 2270. Alternatively, or in addition to screwing the blocker to the blade, the blocker may be brazed to the leading face of the blade or any other attachment mechanisms described above.

According to some embodiments of the present disclosure, a rolling cutter assembly may have a blocker formed from at least one of tungsten carbide, steel, and diamond and/or the retention end of the blocker may be coated with diamond or other hard material to reduce erosion. A diamond or diamond-like coating may also cover the retention end of the blocker at the point of contact between the blocker retention end and rolling cutter face to reduce wear and friction between the blocker and rolling cutter.

Forming Drill Bits with Rolling Cutter Assemblies

Also within the scope of this disclosure is a method of manufacturing drill bits having rolling cutter assemblies according to embodiments described herein. A drill bit according to the embodiments of the present disclosure may include forming a bit body having a threaded pin end and a cutting end, wherein at least one blade is formed on the cutting end, and wherein each blade has a plurality of cutter pockets formed therein. Drill bits formed from a matrix material may have the cutter pockets formed in each blade by positioning cutting element place holders into a bit mold, and then pouring the bit matrix material in the mold around the cutting element place holders. Once the bit is formed and the place holders removed, cutting elements may then be placed into the cutter pockets. Alternatively, drill bits formed from a steel bit body may have the cutter pockets machined into the blades.

Similar to cutter pockets, cavities or insets may also be formed in a bit mold or by a machining process. Cavities may be formed within the leading face of a blade, beneath a cutter pocket, such that the cavity opens at the leading face of the blade and extends into the blade.

A rolling cutter according to any of the embodiments described above may be placed into at least one of the plurality of cutter pockets on a blade. A blocker may then be positioned adjacent to the rolling cutter and a portion of the blade by attaching an attachment end of the blocker to the portion of the blade, such that a retention end of the blocker covers a portion of the cutting face. The attachment end of the blocker may be attached to a portion of the blade by any of the methods described above, including, for example, inserting an attachment end of a blocker into a cavity formed in the leading face of a blade, screwing an attachment end of a blocker into a threaded wall piece in the leading face of a blade, and fitting a shaft part of a rolling cutter substrate into a bearing assembly. Further at least one fixed cutting element may be attached to a blade by brazing the fixed cutting element into at least one of the plurality of cutter pockets.

Figure 21:
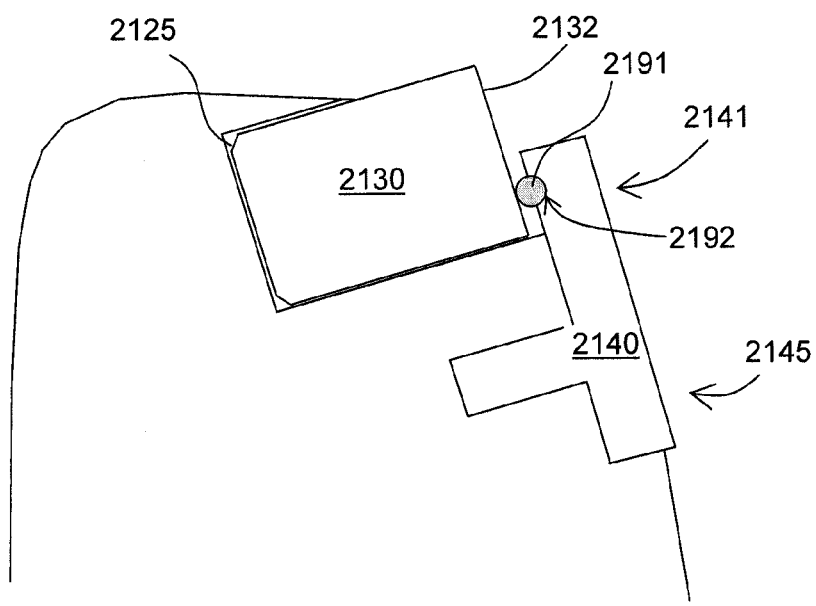
FIG. 21 shows a cross-sectional view of an embodiment according to the present disclosure.

In some embodiments according to the present disclosure, a thin metal film may be used as a shim stock between the cutting face of the rolling cutter and the blocker, which may be removed after the blocker is secured to the blade to ensure a desired clearance "axial" is maintained between the rolling cutter and the blocker. The clearance axial refers to a space between the rolling cutter and blocker, which may be designed to allow for the rolling cutter to rotate without undue friction from the blocker. In some embodiments, the axial space may be between 0.001 and 0.010 inches. In other embodiments, a rolling bearing may be placed between the blocker and the cutting face of a rolling cutter to provide a low friction point of contact between the rolling cutter and blocker. For example, FIG. 21 shows a cross-sectional view of a rolling ball bearing 2191 positioned between the retention end 2141 of a blocker 2140 and the cutting face 2132 of a rolling cutter 2130. The ball bearing 2191 may be held in place in a dimple 2192 formed in the inner surface of the retention end 2141, wherein the dimple 2192 is configured to mate with the ball bearing 2191. Advantageously, a smaller point of contact created by a ball bearing may also allow increased flow of drilling fluids around the cutting face of the rolling cutter, thereby maintaining a cooler cutting face. Alternatively, or additionally, at least one roller bearing may be placed between the bottom end of the rolling cutter and the cutter pocket to provide reduced friction between the pocket and the rolling cutter to aid in rolling.

In some embodiments of the present disclosure, a blocker may be attached to the leading face of a blade after a rolling cutter is positioned within a cutter pocket. In other embodiments, a blocker may extend a length along the leading face of a blade so that a single blocker may retain more than one rolling cutter. In such embodiments, the retention end of the blocker may cover a portion of more than one rolling cutter positioned within a cutter pocket. The attachment end of such a blocker would thus extend along at least a portion of the length of the blade beneath the more than one rolling cutters and be attached thereto by mechanical and/or brazing methods. For example, referring back to FIG. 22, the blocker 2240 extends along a portion of the length of the blade 2220 such that it covers a portion of each rolling cutter 2230, but does not cover the fixed cutter 2250.

The cutter pockets and thus cutting elements (either rolling cutters or fixed cutting elements) may be configured to have a side rake and/or a back rake angle. A side rake is the angle between the cutting surface of the cutting element and the radial plane of the drill bit. A cutting element disposed on a drill bit with side rake may be forced forward in a radial and tangential direction when the bit rotates. Such rotation may allow greater drill cuttings removal and provide an improved rate of penetration. In some embodiments of the present invention, rolling cutters may benefit from increased side rake because the radial direction may assist the rotation movement of the rolling cutters. A backrake is the angle between the cutting surface of a cutting element and a line perpendicular to the formation being drilled. The backrake angle may assist in the rotatability of a rolling cutter as more pressure may be exerted on one side of cutting surface. The high pressure on one side of cutting surface may induce a faster rotation speed, thereby increasing drill cutting removal, increasing rate of penetration, and preventing uneven wear patterns.

One of ordinary skill in the art will realize that any backrake and side rake combination may be used with the rolling cutters of embodiments of the present invention to enhance rotatability and/or improve drilling efficiency. For example, embodiments of the present disclosure may have side rake angles in the range of about 5 degrees to about 40 degrees. In some embodiments, the cutting elements may have a side rake angle ranging between about 10 and 35 degrees. In other embodiments, the cutting elements may have a side rake angle ranging between about 15 and 30 degrees.

Figure 17A:
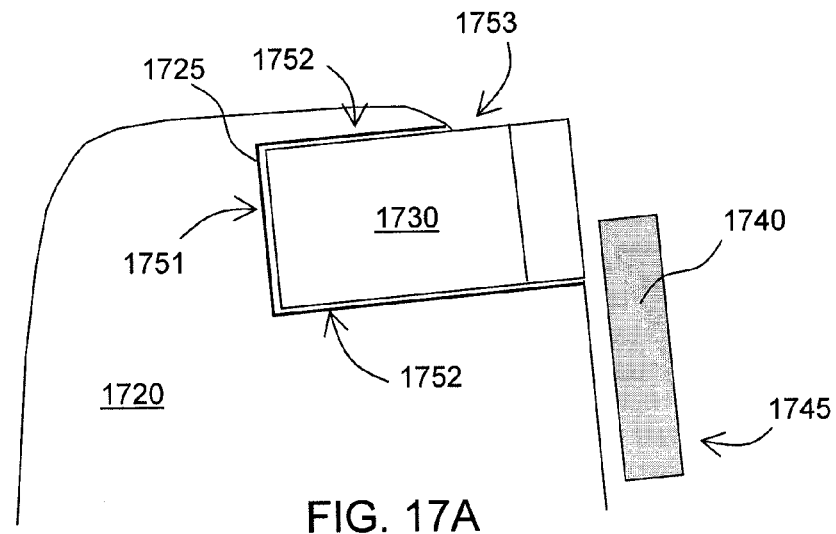
FIGS. 17A-D show cross-sectional views and a schematic of other exemplary embodiments of the present disclosure.
Figure 17B:
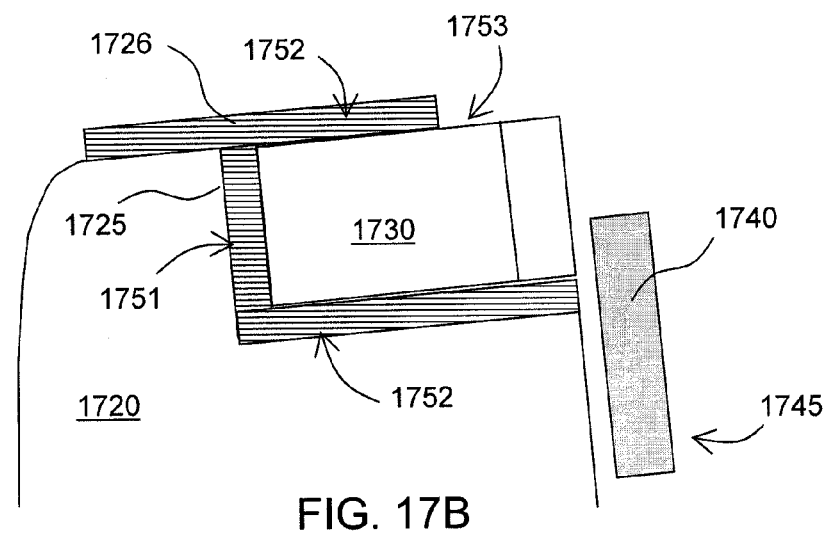
Figure 17C:
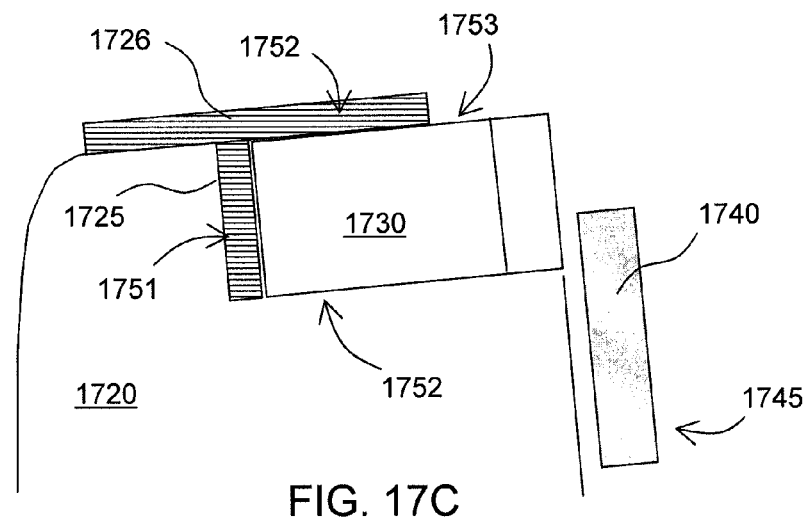

A cutter pocket may be formed directly within a blade, or alternatively, at least a portion of a cutter pocket may be formed from a separate component from the remaining portion of the cutter pocket. According to embodiments disclosed herein, a cutter pocket is formed within a drill bit blade, wherein the cutter pocket has a bottom, a side, and an opening facing the top and/or leading face of the blade. Referring to FIG. 17A, a cutter pocket 1725 having a bottom 1751, a side 1752, and an opening 1753 is formed directly within the blade 1720. The bottom, side, and opening of a cutter pocket may have various shapes and sizes to fit with the shape and size of a corresponding cutting element. For example, cutter pockets that are formed to receive cylindrical cutting elements may have a circular shaped bottom and a side with an arc length that corresponds to the circumference of the cutting element to be disposed in the cutter pocket. Further, the bottom and/or the side of a cutter pocket may be formed from a separate component, which may be attached (e.g., brazed) to the blade adjacent to the portion of the cutter pocket that has already been formed. Referring now to FIGS. 17B and 17C, at least a portion of the cutter pocket is formed from separate components. In FIG. 17B, both the bottom 1751 and the side 1752 of the cutter pocket 1725 are formed from separate components that have been attached to the blade 1720. In FIG. 17C, the bottom 1751 and a portion of the side 1752 are formed from separate components. The separate components may be configured to correspond with the rest of the cutter pocket and to receive a cutting element. Further, the separate component may be coated to reduce friction between the cutter pocket and a rolling cutter.

Figure 14A:
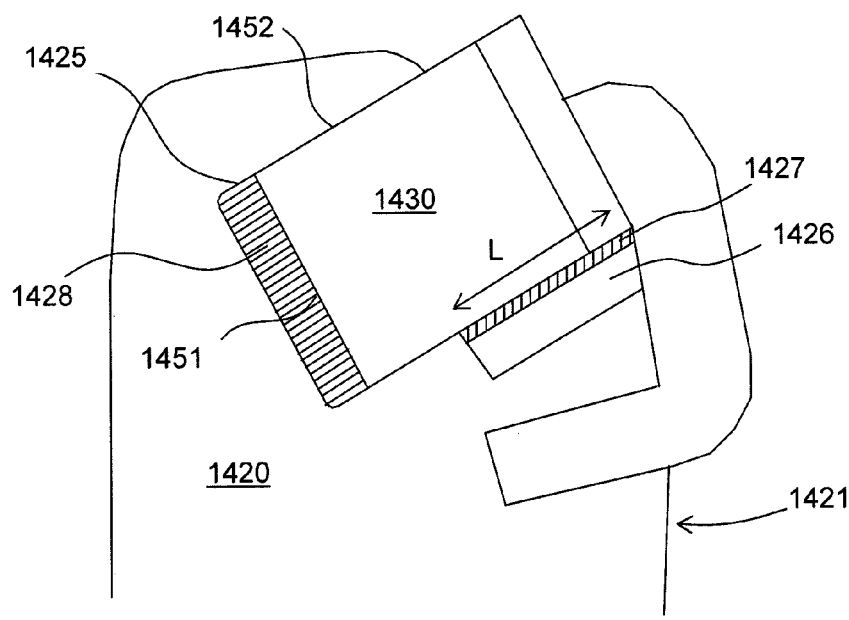
FIGS. 14A-B show a side and front cross-sectional view of embodiments of the present disclosure.
Figure 14B:
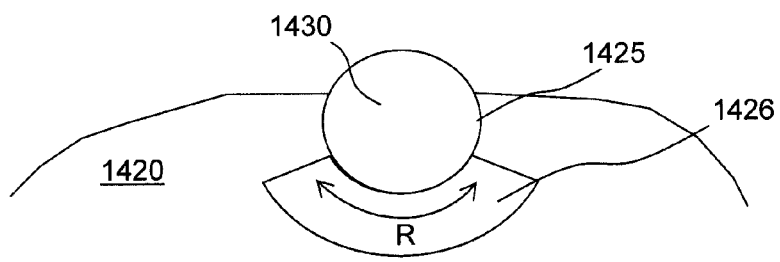

Another exemplary embodiment of a cutter pocket formed from separate components is shown in FIGS. 14A and 14B. Referring to FIG. 14A, a rolling cutter 1430 may be positioned within a cutter pocket 1425, wherein a portion of the cutter pocket 1425 is defined by a separate side component 1426 and a separate bottom component 1428. The separate side component 1426 may have a coating 1427 disposed on at least a portion of the side component 1426. In some embodiments, the coating may include at least one layer of polycrystalline diamond, polycrystalline cubic boron, diamond like carbon ("DLC"), or other hard materials, such as carbides, nitrides, and borides, or a combination of such materials, for example. The thickness of the coating can be based on the coating materials and the request of drilling applications. For example, the coating thickness may range from about 1 micron to 3 mm. Alternatively, the components may be formed of such materials in their entirety. Further, the side component may extend a distance along the length of the cutter pocket and a radial distance around the inner circumference of the cutter pocket. For example, FIG. 14A shows a separate component 1426 having a coating 1427 thereon, wherein the separate component 1426 extends a length L of the cutter pocket 1425. In the embodiment shown in FIG. 14A, the separate component 1426 extends from the leading face 1421 of the blade 1420 a distance L into the blade 1420, to form a portion of the cutter pocket 1425. In some embodiments, the separate component may extend partially into the blade to form part of the side of the cutter pocket. For example, distance L may be at least ⅓ or at least ½ of the length of the cutter pocket. In other embodiments, the separate component may extend the entire length of the cutter pocket side. As seen in FIG. 14B, a separate side component 1426 may also extend a radial distance R around the arc length of the cutter pocket 1425 within the blade 1420 to form part of the side of the cutter pocket 1425. In one embodiment, R may vary from 30 degree to 360 degree. In another embodiment, R may vary from 90 degree to 240 degree. In a preferred embodiment, R may vary from 120 to 180 degree.

A cutter pocket may have a separate component form part of the cutter pocket, or alternatively, a separate component may form the entire cutter pocket. For example, referring again to FIG. 14A, a back component 1428 may be inserted into the bottom of a cutter pocket 1425 such that the back component 1428 forms the bottom 1451 of the cutter pocket 1425 and is adjacent to the back end of a rolling cutter 1430. A portion of the side 1452 of the cutter pocket is formed directly from the blade 1420. Another exemplary embodiment of a cutter pocket formed from separate components is shown in FIG. 13B. As shown in FIG. 13B, a sleeve 1326 forms both the side 1352 and bottom 1351 of a cutter pocket 1325. A sleeve refers to a single separate component that includes both the back and the sides of a cutter pocket. In such an embodiment, the sleeve may be placed in a mold and cast in place or brazed in place. Separate components, including back components, side components, and sleeves may be formed from at least one of polycrystalline diamond, polycrystalline cubic boron, or other hard materials, such as carbides, nitrides, and borides, or a combination of such materials, for example.

Figure 17D:
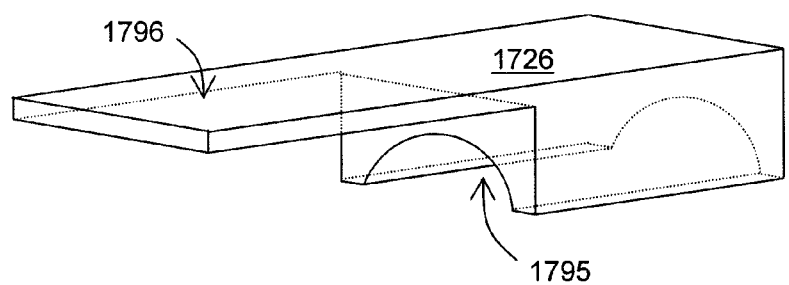

In yet other embodiments of the present disclosure, a blade may have open cutter pockets formed within the top and leading face of the blade. As referred to herein, "open cutter pockets" are cutter pockets that do not have a top side wall, i.e., the opening of the cutter pocket opens at both the leading face of the blade and the top of the blade. Referring back to FIG. 17C, an open cutter pocket 1725 is formed directly within a blade 1720. A separate component is disposed in the cutter pocket 1725 to form the back 1751 of the cutter pocket 1725, and a rolling cutter 1730 may then be placed in the cutter pocket 1725. A blocker 1740 is attached to the leading face of the blade 1720 by brazing the attachment end 1745 of the blocker to the blade 1720 such that the blocker covers a portion of the cutting face of the rolling cutter 1730. A pocket cover 1726 may be placed over the rolling cutter 1730 before, after, or concurrently with attaching the blocker. The pocket cover 1726 thus forms a portion of the side 1752 of the cutter pocket 1725. A pocket cover may be formed of a carbide material and may be replaceable. Further, a pocket cover may be brazed to the top of the blade (rearward of the cutter) to secure the pocket cover in place. According to embodiments of the present disclosure, a pocket cover may have a bottom side (i.e., side that faces the rolling cutter) that is flat, or alternatively, the pocket cover may have a bottom side that is configured to fit the shape of a rolling cutter. For example, referring to FIG. 17D, a pocket cover 1726 has a bottom side 1795 that is configured to fit the side of a cylindrical rolling cutter (not shown). The pocket cover 1726 also has a tail 1796 that may be brazed to the top of a blade (not shown), thereby holding the pocket cover in place over the rolling cutter.

Figure 1A:
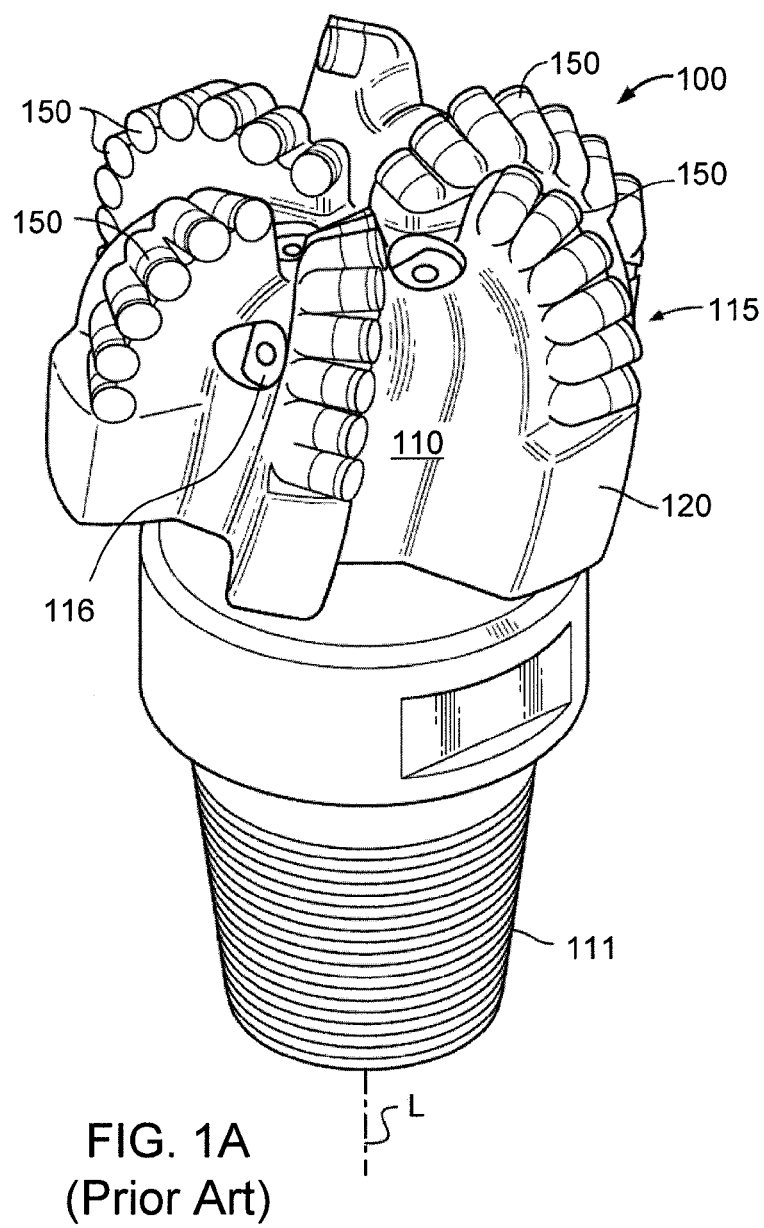
FIGS. 1A-B show a side and top view of a conventional drag bit.
Figure 1B:
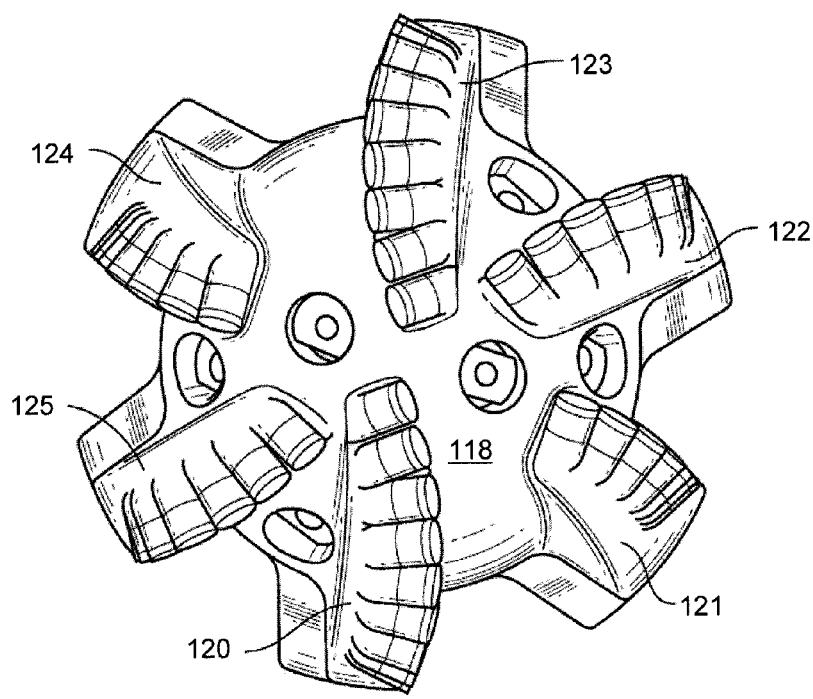
Figure 2:
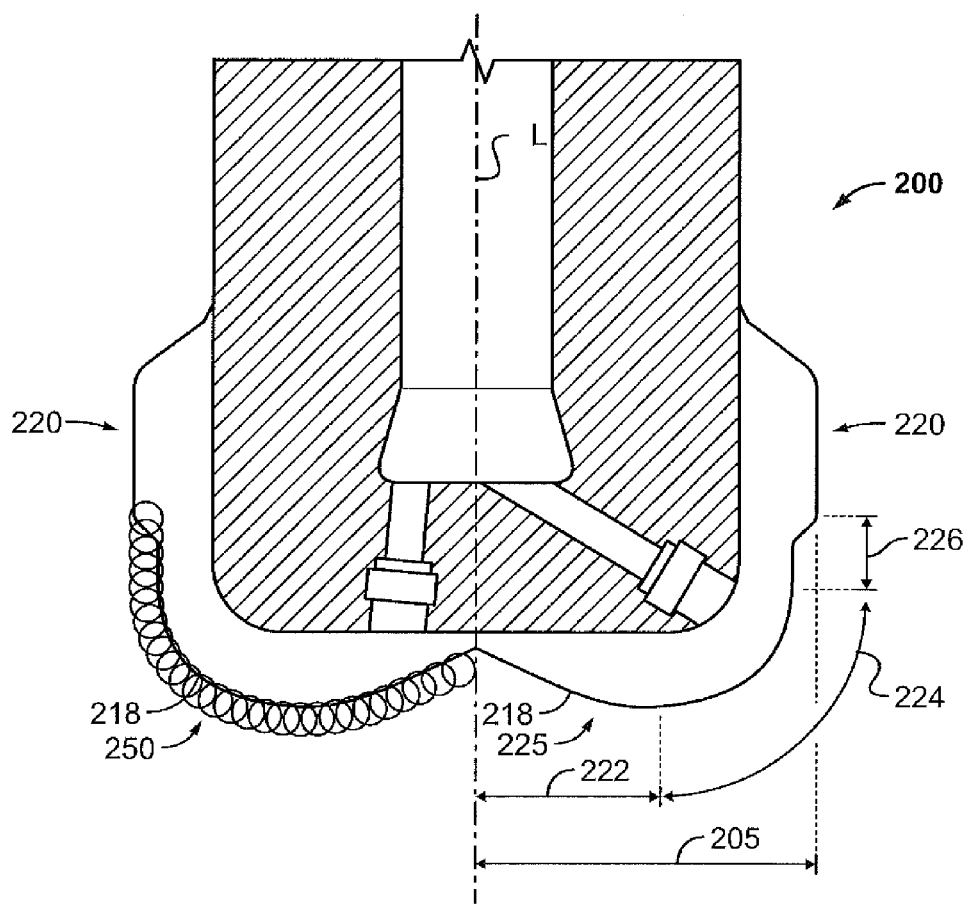
FIG. 2 shows a profile view of a conventional PDC bit.

Further, referring back to FIGS. 3A and 3B, a rolling cutter drill bit 300 may include primary blades 355 and secondary blades 335. Primary blades 355 are generally defined as blades that extend from a bit center area or cone region (222 in FIG. 2), substantially proximal a central axis of the bit, to a gage region (226 in FIG. 2). Secondary blades 335 are generally defined as blades that are spaced between the primary blades and begin a radial distance D from the central axis and extend to the gage region. Each primary blade may include primary cutters or a combination or primary cutters and backup cutters. Similarly, each secondary blade may include primary cutters or a combination of primary cutters and backup cutters.

Further, blades 320 may vary in height H (i.e., distance from the surface of the bit body 310 to the top of the blade) and in radial length, i.e., the distance measured from the outer radius/gage R of the bit, extending radially inward toward the center axis of the bit. Blades having a radial length extending substantially to the center axis of the bit may be referred to as primary blades 355, whereas blades having a radial length extending less than the primary blades (i.e., blades that do not extend substantially to the center of the bit) may be referred to secondary blades 335. For example, as shown in FIGS. 3A and 3B, the drill bit 300 has two primary blades 355 and two secondary blades 335. A plurality of fixed cutting elements 350 are disposed in cutter pockets 325 on the primary blades 355 and a plurality of rolling cutters 330 are disposed in cutter pockets 325 on the secondary blades 335, or vice versa. In some embodiments, at least one rolling cutter 330 and at least one fixed cutting element 350 may be disposed on the same blade, either a primary blade 355 or secondary blade 335. Further, in other embodiments, a drill bit may have at least one primary blade having at least one fixed cutting element thereon and at least on secondary blade having at least one rolling cutter thereon.

Figure 15:
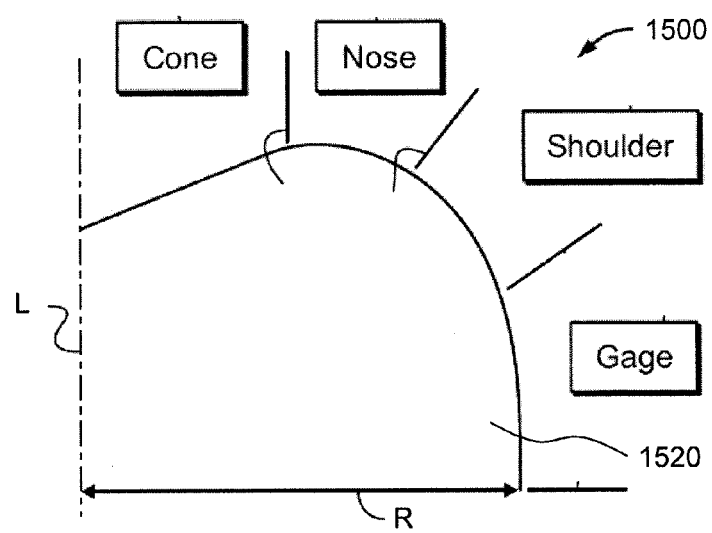
FIG. 15 shows a diagram of a blade profile.

As seen in FIG. 15, a blade 1520 may have four regions: a cone region, a nose region, a shoulder region, and a gage region. A cone region may be defined by the location of one or more secondary blades. For example, a cone region may extend from the central axis of the bit to a distance at which a secondary blade begins (e.g., distance "D" illustrated in FIG. 3). In other words, the outer boundary of the cone region may coincide with the distance "D" at which one or more secondary blades begin. A nose region may be defined as the region of the blade that first contacts the bottom of the wellbore. A shoulder region may be defined as the curved portion of the blade located between the nose and gage region, wherein the gage region is the portion of the blade that defines the outer radius of the bit. In prior art embodiments, fixed cutting elements generally experience more wear in the nose and shoulder regions of a blade. Advantageously, positioning rolling cutters (not shown) in the nose region and/or the shoulder region may allow for increased cutting life of the drill bit when compared to prior art drill bits having fixed cutting elements in the nose and shoulder region. According to some embodiments of the present disclosure, at least one rolling cutter is disposed on at least one of a nose region or a shoulder region of at least one of the blades. For example, referring back to FIG. 11, a blade 1120 may have at least one rolling cutter 1130 in the nose/shoulder region of the blade and at least one fixed cutting element 1150 in the cone and/or gage regions of the blade.

Other advantages of the present disclosure include increased cutter life. Specifically, the rolling cutter assemblies of the present disclosure avoid high temperatures generated by conventional fixed cutters. The lower temperatures at the cutting face and edge of the rolling cutters may decrease fracture potential, thereby extending the functional life of the cutting element. Additionally, because the edge of the cutting element contacting the formation changes as the rolling cutter rotates, the cutting edge remains sharp, avoiding the generation of a local wear flat. The sharp cutting edge may increase the rate of penetration while drilling formation, thereby increasing the efficiency of the drilling operation. Further, as the rolling cutter rotates, a hydraulic force may be applied to the cutting surface to cool and clean the surface of the rolling cutter. Additionally, the rolling cutter assemblies of the present disclosure may be made using current manufacturing processes, alleviating the need for new manufacturing equipment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A drill bit, comprising:
a bit body;
a plurality of blades extending radially from the bit body, wherein each blade comprises a leading face and a trailing face;
a plurality of cutter pockets disposed on the plurality of blades;
at least one rolling cutter in one of the cutter pockets wherein each rolling cutter comprises:
a substrate, a cutting face, a cutting edge, and a side surface; and
at least one blocker, wherein each blocker is positioned adjacent to one of the at least one rolling cutter on the leading face of the blade and covering a portion of the leading face of the blade, and wherein each blocker comprises:
a retention end, wherein the retention end is positioned adjacent to a portion of the cutting face of each rolling cutter to retain the rolling cutter in the cutter pocket; and
an attachment end, wherein the attachment end is secured to a portion of the leading face of the blade below the at least one rolling cutter.

2. The drill bit of claim 1, further comprising at least one fixed cutting element, wherein each fixed cutting element is disposed in one of the cutter pockets.

3. The drill bit of claim 1, wherein each of the at least one rolling cutters is disposed on at least one of a nose area or a shoulder area of at least one of the plurality of blades.

4. The drill bit of claim 1, wherein at least one groove is formed on at least one of the cutting face, the cutting edge, and the side surface of the rolling cutter.

5. The drill bit of claim 4, wherein at least one non-planar region is arranged axisymmetrically on at least one of the cutting face, the cutting edge, and the side surface.

6. The drill bit of claim 1, wherein the attachment end is inserted into a cavity in the leading face of the blade, thereby directly attaching the attachment end to a portion of the blade.

7. The drill bit of claim 1, wherein the attachment end is brazed to the leading face of the blade.

8. The drill bit of claim 1, further comprising:
a screw; and
at least one threaded cavity formed within the leading face of the blade below each cutter pocket;
wherein the screw is inserted through a hole in the attachment end of the blocker and into the threaded cavity in the blade, thereby attaching the attachment end to a portion of the leading face of the blade.

9. The drill bit of claim 1, further comprising:
at least one threaded cavity formed within the leading face of the blade below each cutter pocket;
wherein the attachment end of the blocker is screwed into the threaded cavity.

10. The drill bit of claim 9, wherein the threaded cavity comprises a threaded nut brazed within a cavity.

11. The drill bit of claim 1, wherein at least a portion of at least one of the cutter pockets is defined by a separate component from the remaining portion of the cutter pocket.

12. The drill bit of claim 11, wherein a coating is disposed on at least a portion of the separate component that defines the cutter pocket.

13. The drill bit of claim 11, wherein at least one layer is disposed on at least a portion of the separate component, and wherein the at least one layer comprises a material selected from polycrystalline diamond, polycrystalline cubic boron nitride, and hard carbides.

14. The drill bit of claim 11, wherein a separate component comprises a top plate, wherein the top plate is attached to the blade proximate to the side surface of the rolling cutter to form a portion of the cutter pocket.

15. The drill bit of claim 1, wherein the at least one rolling cutter is configured to have a side rake angle in the range of about 5 to 40 degrees.

16. The drill bit of claim 1, wherein the at least one rolling cutter is configured to have a side rake angle in the range of about 10 to 35 degrees.

17. The drill bit of claim 1, wherein the at least one rolling cutter is configured to have a side rake angle in the range of about 15 to 30 degrees.

18. The drill bit of claim 1, wherein the blocker comprises at least one of tungsten carbide, steel, and diamond.

19. The drill bit of claim 18, wherein the retention end of the blocker comprises diamond.

20. The drill bit of claim 1, wherein the attachment end is attached to a protrusion on the leading face of the blade.

21. The drill bit of claim 20, wherein the attachment end is inserted in a vertical cavity in the protrusion.

22. The drill bit of claim 1, wherein the cutting face comprises a concave portion and the retention end of the blocker comprises a convex portion, and wherein the convex portion mates with the concave portion.

23. The drill bit of claim 1, wherein the cutting face comprises a convex portion and the retention end of the blocker comprises a concave portion, and wherein the convex portion mates with the concave portion.

24. The drill bit of claim 1, wherein the at least one rolling cutter further comprises an internal bore through the cutting face and substrate, and wherein a portion of the retention end mates with a portion of the internal bore.

25. The drill bit of claim 24, wherein the attachment end extends through the internal bore and wherein the retention end is attached at the radial center to the attachment end.

26. The drill bit of claim 1, wherein the retention end comprises a blocker head, a spring, and a contacting piece, wherein the spring is positioned between the blocker head and the contacting piece, and wherein the contacting piece contacts the cutting face of the rolling cutter.

27. The drill bit of claim 1, wherein the cutting edge comprises polycrystalline diamond.

28. The drill bit of claim 1, wherein a lower end of the substrate forms a shaft having a smaller diameter than the rolling cutter.

29. The drill bit of claim 28, wherein the shaft is fitted into a bearing assembly in the blade.

30. The drill bit of claim 29, wherein the bearing assembly comprises a plurality of ball bearings disposed between the rolling cutter and cutter pocket and around the shaft.

31. The drill bit of claim 29, wherein the bearing assembly comprises a plurality of roller bearings disposed between the rolling cutter and cutter pocket and around the shaft.

32. The drill bit of claim 1, wherein the substrate of the rolling cutter comprises a lower end, and wherein the diameter of the substrate decreases along at least a portion of the length of the substrate such that the lower end has a diameter smaller than the diameter of the cutting face.

33. The drill bit of claim 32, wherein the lower end of the substrate has a diameter smaller than 90% of the diameter of the cutting face.

34. The drill bit of claim 32, wherein the lower end of the substrate has a diameter smaller than 80% of the diameter of the cutting face.

35. The drill bit of claim 32, wherein the lower end of the substrate has a diameter smaller than 70% of the diameter of the cutting face.

36. The drill bit of claim 1, wherein the attachment end is attached within a vertical cavity formed in the blade.

37. The drill bit of claim 1, wherein the attachment end is brazed into an inset in the leading face of the blade.

38. The drill bit of claim 1, wherein the retention end is rotatably mounted to the attachment end.

39. The drill bit of claim 1, further comprising a ball bearing, wherein the ball bearing is disposed between the cutting face of the rolling cutter and the retention end of the blocker.

40. A drill bit, comprising:
a bit body;
a plurality of blades extending radially from the bit body, wherein each blade comprises a leading face and a trailing face;
a plurality of cutter pockets disposed on the plurality of blades;
at least one rolling cutter in one of the cutter pockets, wherein each rolling cutter comprises:
a cutting face; and
a substrate having a side surface and a lower end opposite from the cutting face, wherein the lower end directly faces one of the plurality of blades; and
at least one blocker, wherein each blocker covers a portion of the cutting face and interfaces a portion of the side surface of one or more rolling cutters.

41. The drill bit of claim 40, wherein one blocker covers a portion of two or more rolling cutters disposed on a blade.

42. The drill bit of claim 40, further comprising at least one fixed cutting element, wherein each fixed cutting element is disposed in one of the cutter pockets.

43. The drill bit of claim 40, wherein the lower end of the substrate is directly adjacent to one of the plurality of blades.

* * * * *